(12) United States Patent
Kang et al.

(10) Patent No.: US 9,869,974 B2
(45) Date of Patent: Jan. 16, 2018

(54) ELECTRONIC DEVICE

(71) Applicant: LG ELECTRONICS INC., Seoul (KR)

(72) Inventors: Pilgoo Kang, Seoul (KR); Dongseuck Ko, Seoul (KR); Jeeyoung Cheon, Seoul (KR); Jonghun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/048,476

(22) Filed: Feb. 19, 2016

(65) Prior Publication Data
US 2017/0097614 A1   Apr. 6, 2017

(30) Foreign Application Priority Data

Oct. 1, 2015   (KR) .......................... 10-2015-0138446

(51) Int. Cl.
*G04G 9/12*   (2006.01)
*G04G 9/06*   (2006.01)
(Continued)

(52) U.S. Cl.
CPC ........... *G04G 9/124* (2013.01); *G02B 6/0068* (2013.01); *G02F 1/1368* (2013.01);
(Continued)

(58) Field of Classification Search
CPC ...... G04G 9/0041; G04G 9/0082; G04G 9/06; G04G 9/12; G04G 9/122; G04G 9/124;
(Continued)

(56) References Cited

U.S. PATENT DOCUMENTS 2,128,246 A * 8/1938 Hardesty ................ G02B 6/006
116/286
2,454,280 A * 11/1948 Hardesty ................ G04B 19/30
116/286
(Continued)

FOREIGN PATENT DOCUMENTS

FR   WO 2015170059 A1 *  11/2015   .......... G04G 9/0041
JP        2003295794 A     10/2003
(Continued)

OTHER PUBLICATIONS

International Search Report from PCT/KR2015/010777, dated Jun. 29, 2016.

Primary Examiner — Amy Cohen Johnson
Assistant Examiner — Daniel Wicklund
(74) Attorney, Agent, or Firm — Dentons US LLP

(57) ABSTRACT

An electronic device includes a display module having a hole and including a plurality of first light sources disposed along a perimeter of one side of the display module and a plurality of second light sources which are positioned opposite the plurality of first light sources and are disposed along a perimeter of the other side of the display module, a shaft rotatably inserted into the hole of the display module, a movement which is positioned in the rear of the display module, is connected to one end of the shaft, and provides a rotational force for the shaft, a window which is separated from the display module and is positioned in front of the display module, and a hand which is positioned between the display module and the window and is fixed to the other end of the shaft.

19 Claims, 24 Drawing Sheets

(51) Int. Cl.
  *G04G 9/00* (2006.01)
  *G04G 99/00* (2010.01)
  *G04C 17/00* (2006.01)
  *G04C 17/02* (2006.01)
  *G04G 21/04* (2013.01)
  *F21V 8/00* (2006.01)
  *G02F 1/1333* (2006.01)
  *G02F 1/1335* (2006.01)
  *G02F 1/1368* (2006.01)
  *H04M 1/02* (2006.01)
  *H04M 1/725* (2006.01)

(52) U.S. Cl.
  CPC .. *G02F 1/133308* (2013.01); *G02F 1/133514* (2013.01); *G04C 17/00* (2013.01); *G04C 17/0091* (2013.01); *G04C 17/02* (2013.01); *G04G 9/0041* (2013.01); *G04G 9/0082* (2013.01); *G04G 9/06* (2013.01); *G04G 9/12* (2013.01); *G04G 9/122* (2013.01); *G04G 9/128* (2013.01); *G04G 21/04* (2013.01); *G04G 99/006* (2013.01); *H04M 1/0266* (2013.01); *G02F 2201/56* (2013.01); *H04M 1/7253* (2013.01)

(58) Field of Classification Search
  CPC ...... G04G 9/126; G04G 9/128; G04G 99/006; G04C 17/00; G04C 17/0091
  See application file for complete search history.

(56) References Cited

U.S. PATENT DOCUMENTS

| | | | | | |
|---|---|---|---|---|---|
| 3,509,715 | A | * | 5/1970 | Koster | G04G 9/04 368/240 |
| 3,911,665 | A | * | 10/1975 | Van Berkum | G04C 3/008 368/29 |
| 4,196,581 | A | * | 4/1980 | Nemoto | G04G 9/0047 349/65 |
| 4,247,928 | A | * | 1/1981 | Dorfman | G04G 9/0041 349/100 |
| 4,705,407 | A | * | 11/1987 | Brien | G04B 19/30 368/227 |
| 4,970,815 | A | * | 11/1990 | Sunderland | G09F 19/12 368/240 |
| 5,949,346 | A | * | 9/1999 | Suzuki | B60K 37/02 116/286 |
| 5,984,485 | A | * | 11/1999 | Poli | G04B 19/30 362/23.15 |
| 6,082,867 | A | * | 7/2000 | Chien | A43B 1/0072 313/512 |
| 6,487,143 | B1 | * | 11/2002 | Kaelin | G01D 11/28 362/23.01 |
| 6,556,513 | B2 | * | 4/2003 | Wimberly | G04B 19/23 368/223 |
| 9,244,439 | B1 | * | 1/2016 | Allison | G04C 17/00 |
| 9,622,391 | B2 | * | 4/2017 | Lee | H05K 7/20963 |
| 2003/0103418 | A1 | * | 6/2003 | Hirano | G04C 17/02 368/82 |
| 2006/0083476 | A1 | * | 4/2006 | Winkler | G02B 6/0018 385/146 |
| 2006/0092770 | A1 | * | 5/2006 | Demas | G04B 19/235 368/223 |
| 2006/0164821 | A1 | * | 7/2006 | Usui | G04B 19/32 362/23.17 |
| 2007/0081423 | A1 | * | 4/2007 | Chien | F21S 8/035 368/67 |
| 2007/0109918 | A1 | * | 5/2007 | Furetta | G04G 9/0035 368/294 |
| 2007/0242569 | A1 | * | 10/2007 | Inoue | G02F 1/167 368/205 |
| 2009/0122653 | A1 | * | 5/2009 | Seki | G02F 1/13452 368/82 |
| 2012/0082012 | A1 | * | 4/2012 | Blanckaert | G04B 19/32 368/224 |
| 2014/0233356 | A1 | * | 8/2014 | Pattikonda | G04G 9/0064 368/13 |
| 2015/0029829 | A1 | * | 1/2015 | Spadini | G04G 9/0082 368/226 |
| 2015/0185394 | A1 | * | 7/2015 | Huang | G02B 6/0028 362/610 |
| 2015/0241852 | A1 | | 8/2015 | Yang | |
| 2016/0313593 | A1 | * | 10/2016 | Grip | G02F 1/13452 |
| 2016/0327915 | A1 | * | 11/2016 | Katzer | G04B 19/04 |
| 2016/0363909 | A1 | * | 12/2016 | Kang | G04G 9/04 |
| 2017/0010407 | A1 | * | 1/2017 | Huang | G02B 6/0068 |

FOREIGN PATENT DOCUMENTS

| | | |
|---|---|---|
| JP | 2006275941 A | 10/2006 |
| KR | 100770830 B1 | 10/2007 |
| KR | 1020150029452 A | 3/2015 |

* cited by examiner

ELECTRONIC DEVICE

This application claims the benefit of Korean Patent Application No. 10-2015-0138446 filed on Oct. 1, 2015, the entire contents of which are incorporated herein by reference for all purposes as if fully set forth herein.

BACKGROUND OF THE INVENTION

Field of the Invention

The present disclosure relates to an electronic device, and more particularly, to an electronic device involved in a wearable watch, in which analog and digital are combined.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc.

Efforts are ongoing to support and increase the functionality of mobile terminals. Such efforts include software and hardware improvements, as well as changes and improvements in the structural components.

A study on wearable electronic devices the user directly wears is being recently carried out. For example, an attempt has been made to study wearable electronic devices of a glass type, a watch type, etc.

Because the wearable electronic device has to arrange necessary electronic components in a limited space while satisfying design requirements, a need for an optimum design of the wearable electronic device is increasing.

SUMMARY OF THE INVENTION

In one aspect, there is an electronic device comprising a display module having a hole, the display module including a plurality of first light sources configured to be disposed along a perimeter of one side of the display module and a plurality of second light sources configured to be positioned opposite the plurality of first light sources and disposed along a perimeter of the other side of the display module, a shaft configured to be rotatably inserted into the hole of the display module, a movement configured to be positioned in the rear of the display module, to be connected to one end of the shaft, and to provide a rotational force for the shaft, a window configured to be separated from the display module and positioned in front of the display module, and a hand configured to be positioned between the display module and the window and fixed to the other end of the shaft.

In another aspect, the electronic device may further comprise a touch sensor positioned on a back surface of the window.

In another aspect, the plurality of first light sources and the plurality of second light sources may be symmetrical to each other with respect to the hole of the display module.

In another aspect, the display module may further include a display panel filled with liquid crystals and a light guide plate positioned in the rear of the display panel. The plurality of first light sources may include at least three light sources which are sequentially positioned adjacent to the side of the light guide plate. The plurality of second light sources may include at least three light sources which are positioned opposite the plurality of first light sources with the hole of the display module interposed therebetween and are sequentially positioned adjacent to the side of the light guide plate.

In another aspect, the plurality of first light sources may be positioned within the range of about 120° with respect to the hole of the display module. The plurality of second light sources may be positioned within the range of about 120° with respect to the hole of the display module and positioned opposite the plurality of first light sources.

In another aspect, the display module may further include a frame configured to be positioned in the rear of the light guide plate and to have a diameter greater than the light guide plate, a plate configured to be positioned in the rear of the frame, at least a portion of an outer perimeter of the plate being removed, and a flexible printed circuit board (FPCB) configured to be positioned in at least a portion removed from the outer perimeter of the plate, to extend toward the light guide plate, and to be placed on the frame at the side of the light guide plate. The plurality of first and second light sources may be electrically connected to the flexible printed circuit board placed on the frame.

In another aspect, the flexible printed circuit board may be positioned in at least a portion removed from the outer perimeter of the plate. One side of the flexible printed circuit board may extend toward the light guide plate and may be placed on the frame at one side of the light guide plate. The other side of the flexible printed circuit board may extend toward the light guide plate and may be placed on the frame at the other side of the light guide plate. The plurality of first light sources may be e electrically connected to the one side of the flexible printed circuit board. The plurality of second light sources may be electrically connected to the other side of the flexible printed circuit board.

In another aspect, the display module may further include a display panel configured to be filled with liquid crystals. The display panel may include a sealing member configured to be positioned adjacent to the hole of the display module.

In another aspect, the display module may include an active area, in which a screen is displayed, and a deactive area, in which the screen is not displayed. The deactive area may include a first deactive area formed in an outer portion of a front surface of the display module and a second deactive area formed in the middle of the front surface of the display module. The hole of the display module may be formed in the second deactive area.

In another aspect, the display module may include thin film transistor (TFT) lines around the second deactive area.

In another aspect, the display module may further include a first substrate, a second substrate positioned opposite the first substrate, a liquid crystal layer positioned between the first substrate and the second substrate, a color filter formed on the first substrate, and thin film transistor (TFT) lines formed on the second substrate while avoiding the hole of the display module.

In another aspect, the electronic device may further comprise a gear box configured to be mechanically connected to the movement and a crown configured to be mechanically connected to the gear box. The shaft may rotate depending on a rotation of the crown.

In another aspect, the shaft may include an internal shaft and an external shaft configured to surround the internal shaft. The hand may be in the plural. The plurality of hands may include a first hand configured to be fixed to the internal shaft and a second hand configured to be fixed to the external shaft.

In another aspect, the first hand may be different from the second hand in at least one of a length, a width, and a shape.

In another aspect, the electronic device may further comprise a controller configured to display a clock index through the display module. The controller may be configured to display at least one of a chronograph, a small second, a dial, data information, day information, and climate information through the display module.

In another aspect, the electronic device may further comprise a wireless communication unit. The controller may be configured to interwork with an external terminal or an external electronic device through the wireless communication unit.

In another aspect, the display module may have a circular shape corresponding to a circle drawn by rotating the hand. The hole may be formed in the middle of the display module.

According to at least one of the aspects of the present disclosure, an analog hand and a digital index can be simultaneously implemented.

According to at least one of the aspects of the present disclosure, a shadow area can be prevented from being formed in the display module having the hole.

According to at least one of the aspects of the present disclosure, an arrangement of the light sources for preventing the shadow area from being formed in the display module having the hole can be provided.

According to at least one of the aspects of the present disclosure, an arrangement of the light sources for implementing a slim watch can be provided.

According to at least one of the aspects of the present disclosure, a shape of the TFT lines of the display module having the hole can be provided.

According to at least one of the aspects of the present disclosure, the electronic device for interworking with another terminal or another electronic device can be provided.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
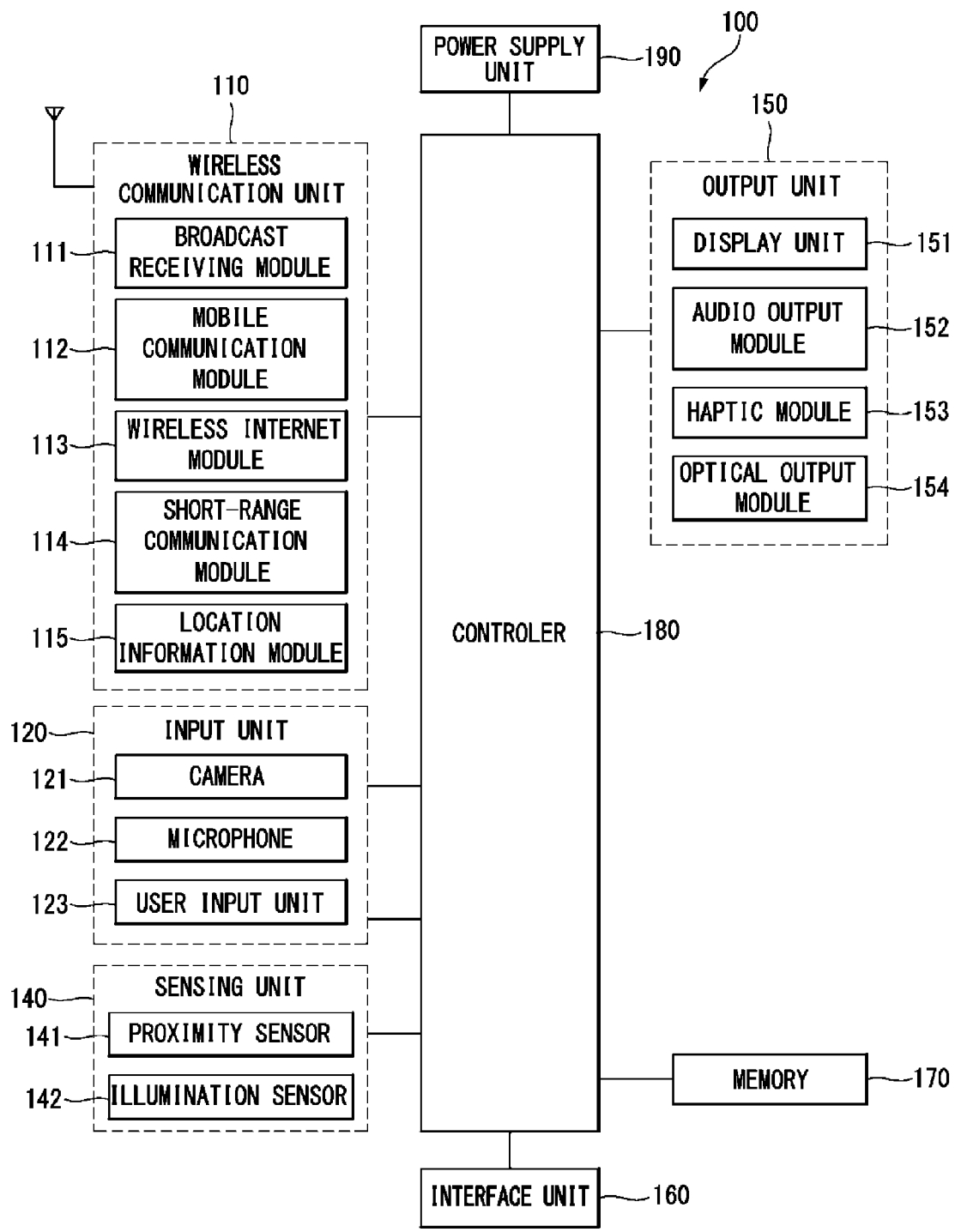
FIG. 1 is a block diagram of an electronic device according to an exemplary embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Electronic devices disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of electronic devices, such as those types noted above. In addition, these teachings may also be applied to stationary terminals such as digital TV, desktop computers, and the like.

Reference is now made to FIG. 1, where FIG. 1 is a block diagram of an electronic device according to an exemplary embodiment of the invention.

The electronic device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the electronic device 100 is shown having wireless communication unit 110 configured with several commonly implemented components. For instance, the wireless communication unit 110 typically includes one or more components which permit wireless communication between the electronic device 100 and a wireless communication system or network within which the electronic device is located.

The wireless communication unit 110 typically includes one or more modules which permit communications such as wireless communications between the electronic device 100 and a wireless communication system, communications between the electronic device 100 and another electronic device, communications between the electronic device 100 and an external server. Further, the wireless communication unit 110 typically includes one or more modules which connect the electronic device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the electronic device, the surrounding environment of the electronic device, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control overall operation of the electronic device 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the electronic device 100. The power supply unit 190 may include a battery, and the battery may be configured to be embedded in the device body, or configured to be detachable from the device body.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the electronic device 100 and a wireless communication system, communications between the electronic device 100 and another electronic device 100, or communications between the electronic device and a network where another electronic device 100 (or an external server) is located, via wireless area networks. One example of the wireless area networks is a wireless personal area networks.

In some embodiments, another electronic device (which may be configured similarly to the electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device. As one example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module.

The input unit 120 may be configured to permit various types of input to the electronic device 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the electronic device 100. As another example, the cameras 121 may be located in a stereoscopic arrangement to acquire left and right images for implementing a stereoscopic image.

The microphone 122 is generally implemented to permit audio input to the electronic device 100. The audio input can be processed in various manners according to a function being executed in the electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the electronic device 100. The user input unit 123 may include one or more of a mechanical input element (for example, a key, a button located on a front and/or back surface or a side surface of the electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like. The controller 180 generally cooperates with the sending unit 140 to control operation of the electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitive proximity sensor, a magnetic proximity sensor, an infrared proximity sensor, and the like. When the touch screen is implemented as a capacitive touch sensor, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the electronic device 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control the general operations of the electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the electronic device 100. The power supply unit 190 may include a battery, which is typically rechargeable or be detachably coupled to the device body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The electronic device may be expanded to a wearable device the user can directly wear beyond a hand-held device, which the user has and uses in his or her hand. Examples of the wearable device include a smart watch, a smart glass, and a head mounted display (HMD). Examples of the electronic device expanded to the wearable device will now be described in more detail.

The wearable device may be configured to exchange (or interwork) data with another electronic device 100. The short-range communication module 114 may sense (or recognize) the wearable device, which is positioned around the electronic device 100 and can communicate with the electronic device 100. Furthermore, when the sensed wearable device is a device which is authenticated to communicate with the electronic device 100, the controller 180 may transmit at least a portion of data processed in the electronic device 100 to the wearable device via the short-range communication module 114. Thus, the user of the wearable device may use the data processed in the electronic device 100 on the wearable device. For example, when a call is received in the electronic device 100, the user may answer the call using the wearable device. Also, when a message is received in the electronic device 100, the user may check the received message using the wearable device.

At least a portion of the components illustrated in FIG. 1 may cooperatively operate to implement an operation, a control, or a control method of the electronic device 100 according to various embodiments of the invention that will be described below. The operation, the control, or the control method of the electronic device 100 may be implemented by the execution of at least one application program stored in the memory 170.

The watch type electronic device 100 according to the embodiment of the invention is a kind of the mobile terminal which the user wears on his/her wrist. The watch type electronic device 100 may include some or all of the components illustrated in FIG. 1. The characteristics of the watch type electronic device 100 related to its shape will now be described in detail.

Figure 2:
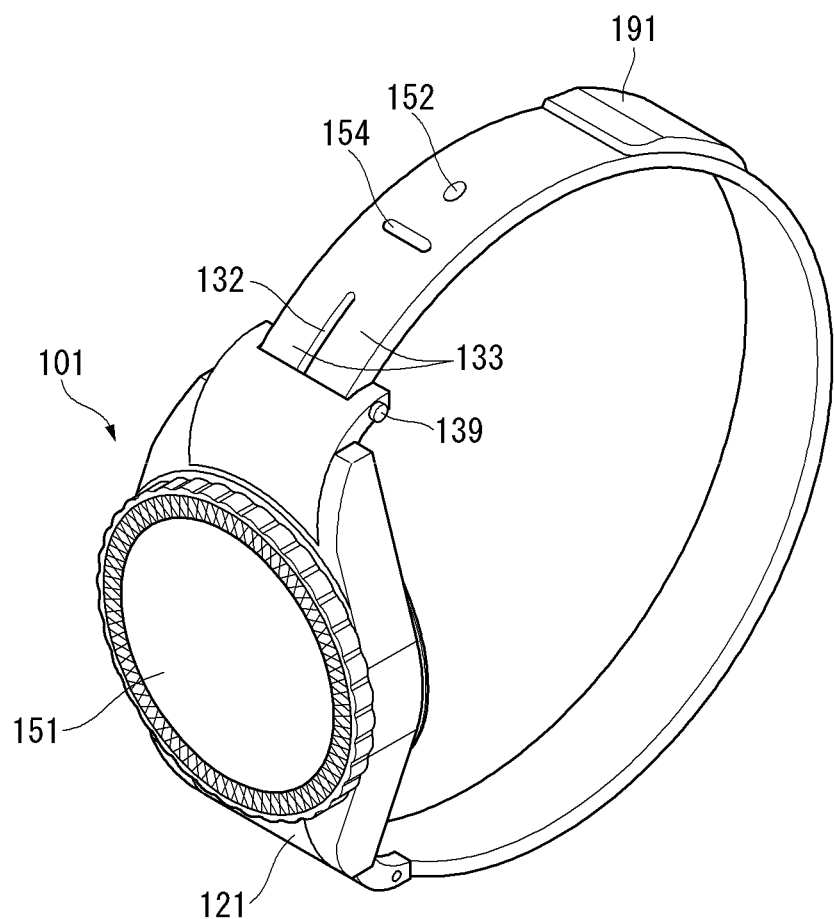
FIG. 2 is a perspective view of an electronic device according to an exemplary embodiment of the invention.
Figure 3:
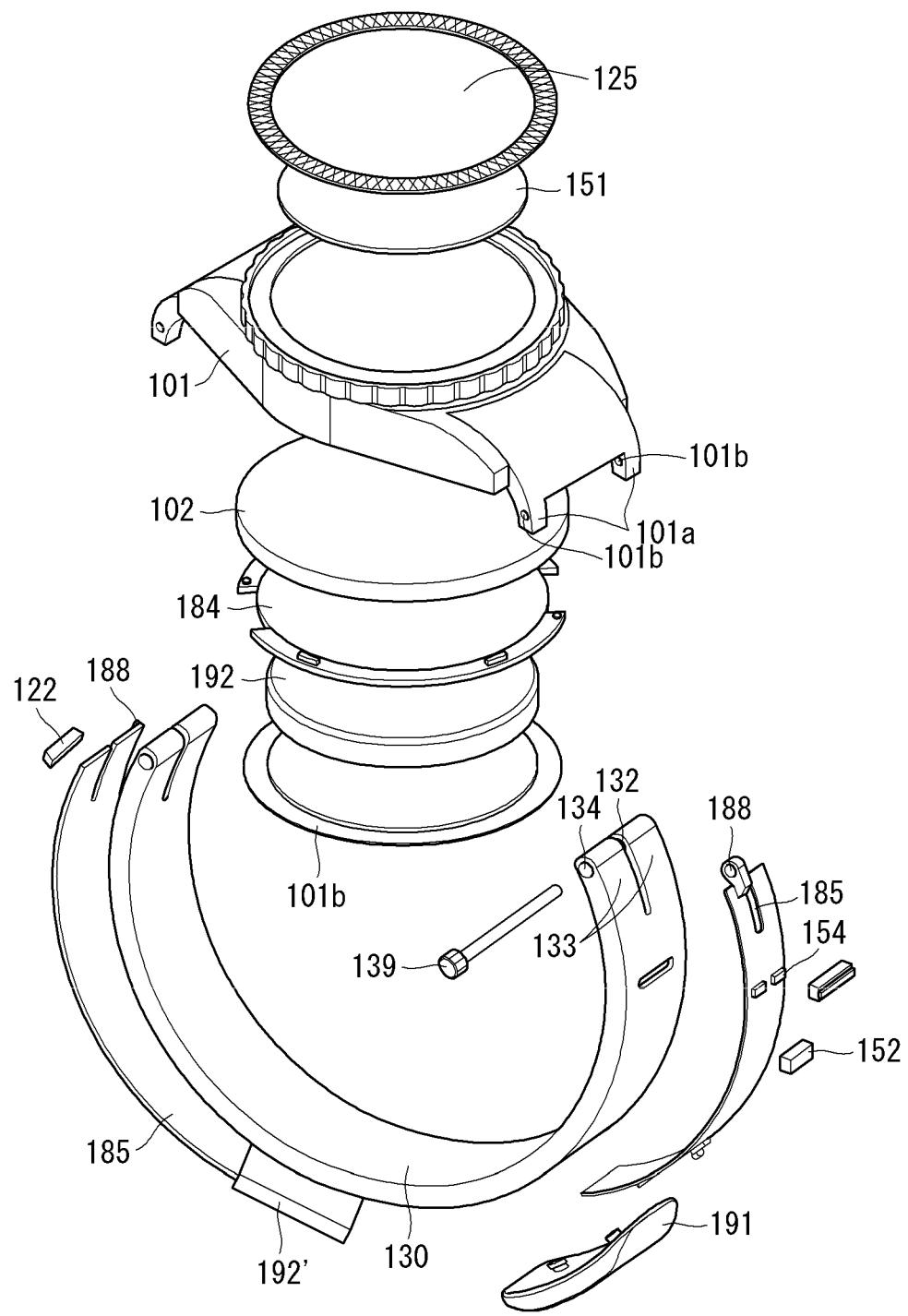
FIG. 3 is an exploded perspective view of the electronic device shown in FIG. 2.

FIG. 2 is a perspective view of the electronic device according to the embodiment of the invention, and FIG. 3 is an exploded perspective view of the electronic device shown in FIG. 2.

The electronic device according to the embodiment of the invention includes a band 130 which has a curved surface in a longitudinal direction or includes a flexible material. The band 130 may be configured to be detachable from a body 101 of the electronic device using a hinge pin 139.

When the band 130 is made of a material with rigidity, the band 130 may have a curved shape. Alternatively, when the band 130 is made of the flexible material, the band 130 may be configured to be flexible. Hence, the user can wear the band 130 by winding the band 130 on his/her wrist. A mounting part, on which electronic components can be mounted, is provided inside the band 130. The band substrate 185, the audio output module 152, the microphone 122, the optical output module 154, an antenna (not shown), etc. may be mounted on the mounting part.

Figure 4:
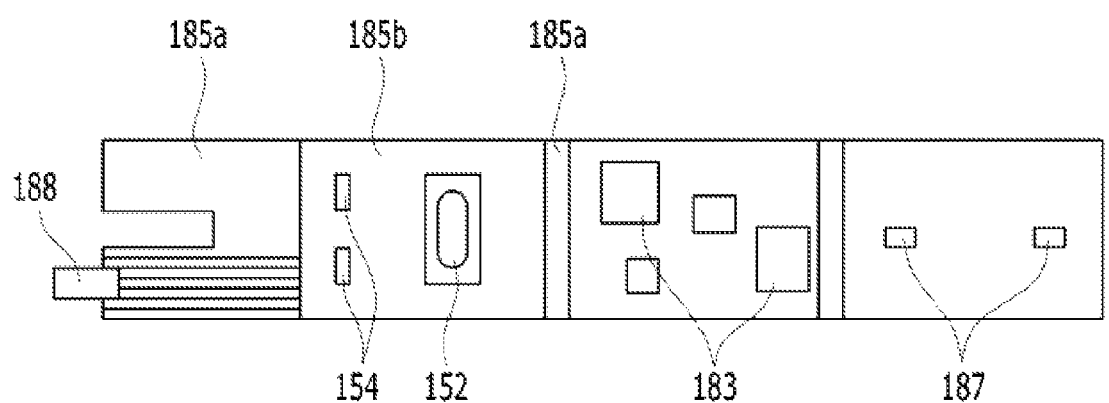
FIGS. 4 and 5 are plane views of a band substrate of an electronic device according to an exemplary embodiment of the invention.
Figure 5:
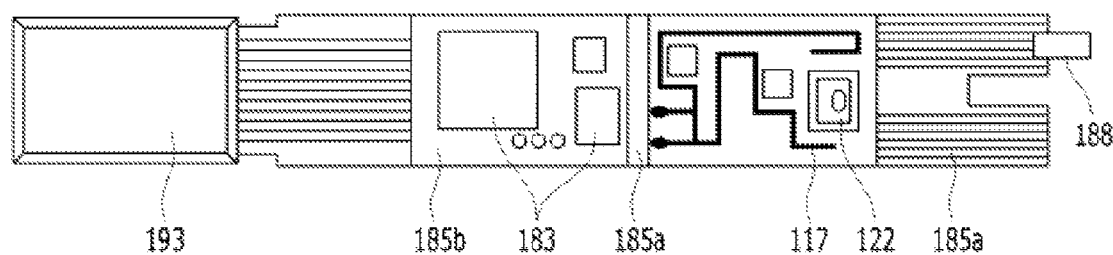

FIGS. 4 and 5 are plane views of the band substrate 185 of the electronic device according to the embodiment of the invention. The band substrate 185 includes a flexible substrate. As shown in FIGS. 4 and 5, a substrate formed of a hard material may be configured as a plurality of parts, and the flexible substrate may be interposed between the plurality of parts. Alternatively, the band substrate 185 may be entirely formed of a flexible material.

An integrated circuit (IC) 183 is mounted on the band substrate 185 and controls the audio output module 152, the microphone 122, the optical output module 154, the wireless communication unit 110, etc. mounted on the band 130. When the IC 183 is connected to the body 101, the IC 183 may also control the body 101. The audio output module 152, the microphone 122, the optical output module 154, an antenna 117, etc. may be mounted on the band 130 separately from the band substrate 185, but may be mounted on the band substrate 185 as shown in FIGS. 4 and 5.

As shown in FIG. 3, the band substrates 185 respectively positioned on both sides of the band 130 may be separated from each other and may be combined to form one band substrate 185. Even if the band substrates 185 are separated from each other, the separated band substrates 185 may be connected to each other when ends of the band 130 are connected to the body 101 or the ends of the band 130 are connected to each other.

The audio output module 152, the optical output module 154, and the IC 183 are positioned on the band substrate 185 disposed on one side of the band 130. Also, a terminal connected to an external battery 191 may be positioned thereon. The microphone 122, the antenna 117, the IC 183, and an internal battery 192' may be mounted on the band substrate 185 disposed on the other side of the band 130. The above arrangement of the band substrate 185 may be changed, and more components including the components noted above may be mounted on the band substrate 185. A slit 132 extending in a longitudinal direction of the band 130 is positioned at the end of the band 130. In the embodiment of the invention, the slits 132 are respectively formed at both ends of the band 130, and each end of the band 130 is divided into two division ends 133 by the slit 132. A number of division ends 133 increases depending on an increase in a number of slits 132.

Even when the band 130 is made of the material with rigidity, the division end 133 may be made of a flexible material. The division ends 133 may bend up and down in a thickness direction of the band 130 and also may bend in different directions.

The band 130 may include a fastening hole 134 extending at the end of the band 130, i.e., at the side of the division end 133 in a width direction of the band 130. The hinge pin 139 is fastened to the fastening hole 134, thereby connecting the band 130 to the body 101. The body 101 includes a hinge hole 101b, through which the hinge pin 139 passes.

The hinge pin 139 passing through the band 130 may be formed of a conductive material and may be electrically connected to a connection ring 188 which is positioned inside the fastening hole 134 and the hinge hole 101b. The connection ring 188 is a ring-shaped member which is positioned inside the fastening hole 134 of the band 130 and is formed of the conductive material. An end of the connection ring 188 may be connected to the band substrate 185 mounted on the band 130.

A clock plate 102 including markings, an hour hand, a minute hand, a second hand, etc. is positioned on a front surface of the body 101. The body 101 includes a band fastening part 101a, which is coupled with the band 130 through the hinge pin 139, at each side of the body 101. The band fastening part 101a includes a pair of fastening protrusions, which are separated from each other by a distance corresponding to a width of the band 130, and the hinge holes 101b formed in the fastening protrusions. As described above, the hinge pin 139 is inserted into the hinge holes 101b and fastens the band 130 to the body 101.

The body 101 may be a clock body having only a function of a general wristwatch. The general wristwatch has the band fastening part 101a so as to replace a band of the wristwatch, and the band 130 can be replaced by inserting the hinge pin 139 into the hinge holes 101b of the band fastening part 101a. Thus, the electronic device according to the embodiment of the invention may be fastened to the general body 101.

In case of the body 101, on the electronic components are not separately mounted, the body 101 may include a battery 192 for driving the clock plate 102. The battery 192 may be used only in a drive of the clock plate 102. The battery included in the band 130 itself may be used to drive the electronic components of the band 130 and used to drive the display unit 151 when the display unit 151 is additionally coupled with the body 101.

Alternatively, as shown in FIG. 3, the body 101, on the electronic components are mounted, may be used. The body 101 includes the display unit 151, a circuit unit 184 for the control, and a main battery 192 for supplying electric power. As shown in FIG. 3, the structure, for example, the camera 121, which is not included in the electronic device, may be included in the body 101.

When the display unit 151 is used as a display of the general wristwatch, the display unit 151 is maintained in a transparent state. Only when information is output through the display unit 151, the display unit 151 may be changed to an opaque or translucent display. A touch sensor 125 is positioned on a front surface of the display unit 151 and may simultaneously perform input and output operations.

When the electronic components are mounted on the body 101, the connection ring 188 is positioned inside the hinge hole 101b for the electrical connection between the electronic components. Hence, the electronic components of the body 101 may be connected to the circuit unit 184 inside the body 101 through the connection ring 188. A function of the electronic device may be expanded through the connection between the body 101 and the bad 130.

For example, when the band 130 is connected to the body 101 having only a display function, wireless communication with a base station, or a call or transmission and reception of data through short range communication can be performed using the antenna 117 included in the band 130. Also, audio information may be output through the audio output module 152 included in the band 130.

In addition to the connection between the band 130 and the body 101 through the end of the band 130, the body 101 may be connected to an external power source through the hinge pin 139 to receive electric power, or may be connected to an external terminal, for example, a computer.

Referring to again FIG. 1, the electronic device according to the embodiment of the invention may apply a short range communication technology, such as Bluetooth™, Radio Frequency Identification (RFID), Infrared Data Association (IrDA), Ultra Wideband (UWB), ZigBee, Near Field Communication (NFC), and Wireless Universal Serial Bus (USB).

Among these, an NFC module included in the electronic device supports contactless type near field communication between terminals at a distance of typically 10 cm or less. The NFC module may operate in one of a card mode, a reader mode, and a peer-to-peer (P2P) mode. The electronic device 100 may further include a security module storing card information, so as to operate the NFC module in the card mode. In the embodiment disclosed herein, the security module may be physical media, such as universal integrated circuit card (UICC) (for example, subscriber identification module (SIM) or universal SIM (USIM)), secure micro SD, and a sticker, and may be logical media (for example, embedded secure element (SE) embedded in the electronic device. Data exchange based on single wire protocol (SWP) may be performed between the NFC module and the security module.

When the NFC module operates in the card mode, the electronic device may transfer card information, which has been stored as in an existing IC card, to the outside. More specifically, when the electronic device storing information of a payment card (for example, a credit card and a transportation card) approaches a payment machine, NFC-enabled mobile payment may be performed. When the electronic device storing information of an access card approaches an access machine, an access approval procedure may start. The credit card, the transportation card, the access card, etc. may be mounted on the security module in the applet, and the security module may store information of the cards mounted thereon. The information of the payment card may include at least one of a card number, balance, and details of usage. The information of the access card may include at least one of a user name, a user ID number, and an access history.

When the NFC module operates in the reader mode, the electronic device may read data from an external tag. In this instance, data the electronic device receives from the tag may be coded into a data exchange format defined in the NFC forum. Further, the NFC forum defines four record types. More specifically, the NFC forum defines four record type definitions (RTDs) including smart poster, text, uniform resource identifier (URI), and general control. When the data received from the tag is the smart poster type, the controller 180 may execute browser (for example, internet browser).

When the data received from the tag is the text type, the controller 180 may execute a text viewer. When the data received from the tag is the URI type, the controller 180 may execute browser or make a call. When the data received from the tag is the general control type, the controller 180 may perform a proper operation depending on control contents.

When the NFC module operates in the P2P mode, the electronic device may perform P2P communication with other electronic device. In this instance, logical link control protocol (LLCP) may be applied to the P2P communication. A connection may be produced between the electronic device and the other electronic device for the P2P communication. The connection may be divided into a connection-less mode, in which one packet switching is performed and ended, and a connection-oriented mode, in which packet switching is successively performed. Through the P2P communication, data, for example, electronic business cards, contact information, digital photographs, and URL, Bluetooth, a setup parameter for WiFi, etc. may be exchanged through the P2P communication. Because an available distance of the NFC communication is short, the P2P mode may be efficiently used to exchange data of small size.

Figure 6:
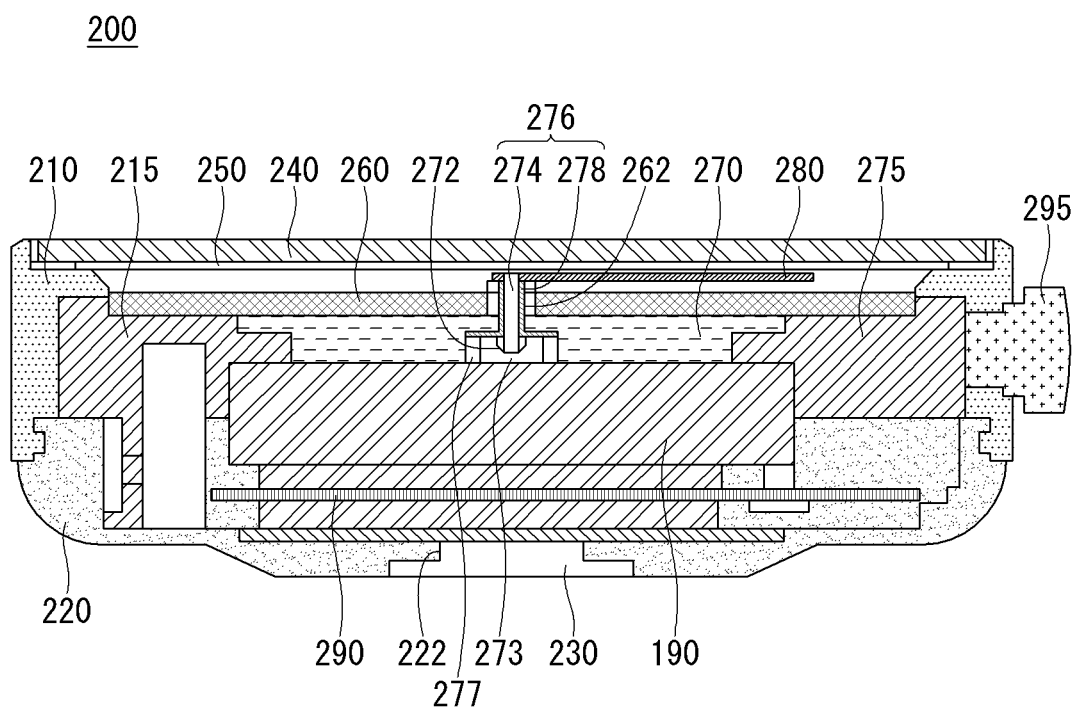
FIG. 6 shows an example of a cross section of an electronic device according to an exemplary embodiment of the invention.

FIG. 6 shows an example of a cross section of an electronic device according to the embodiment of the invention. An electronic device 200 shown in FIG. 6 may include the configuration of the electronic device described above with reference to FIGS. 1 to 5.

In the embodiment disclosed herein, a side of a display module 260, exposed to the outside, included in the electronic device 200 is referred to as a front side or an upper side of the electronic device 200. In other words, the front side or the upper side of the electronic device 200 means the side of the display module 260 the user sees. A side opposite the front side or the upper side of the electronic device 200 is referred to as a back side or a lower side of the electronic device 200. In other words, the back side or the lower side of the electronic device 200 means a back surface or a lower surface of the electronic device 200 when the user sees the front side or the upper side of the electronic device 200. A front surface or an upper surface of the electronic device 200 may be observed at the front side or the upper side of the electronic device 200, and the back surface or the lower surface of the electronic device 200 may be observed at the back side or the lower side of the electronic device 200. A surface between the front surface and the back surface or between the upper surface and the lower surface is referred to as a side or a side surface.

A case 210 may form the side surface of the electronic device 200 or may form a perimeter or an edge of the electronic device 200. The case 210 may be the body 101 described above. A back cover 220 is coupled with the case 210 in the rear of the case 210 and may form the entire or a portion of the back surface of the electronic device 200. A cap 230 may be inserted into the back cover 220. The cap 230 may form a portion of the back surface of the electronic device 200. The cap 230 may pass through the back cover 220 and may be inserted into the back cover 220. A hollow center hole 222 may be formed in the back cover 220, and the cap 230 may be inserted into the center hole 222. The cap 230 may be screw-coupled with center hole 222. A window 240 may be placed or coupled on one side of the case 210. The window 240 positioned on one side of the case 210 may form the front surface of the electronic device 200. A touch sensor 250 may be positioned under the window 240. The touch sensor 250 may be the touch sensor 125 described above. The touch sensor 250 may be attached to a lower surface of the window 240. The touch sensor 250 may be a capacitive sensor. Hence, the touch sensor 250 may sense a motion touching the window 240. The touch sensor 250 may be formed of a transparent material. Hence, the inside of the electronic device 200 may be observed from the front surface of the electronic device 200 through the window 240. In other words, the inside of the electronic device 200 at the front surface may be observed through the window 240. For example, a hand 280, the display module 260, or the display unit 151 may be observed through the window 240. The display unit 151 may be the display module 260, or may be a portion of the display module 260.

The display module 260 may be embedded in the case 210. The display module 260 may be positioned under the window 240. An air gap may be formed between the display module 260 and the window 240. An air gap may be formed between the display module 260 and the touch sensor 250. One surface or one side of the display module 260 may be observed through the window 240 of the electronic device 200. One surface of the display module 260 may entirely have a circular shape. For example, a front surface or a back surface of the display module 260 may entirely have a circular shape. The display module 260 may have a shaft hole 262. The shaft hole 262 may be formed by penetrating from one surface to the other surface of the display module 260. The shaft hole 262 may be positioned in the middle of the display module 260. In the embodiment disclosed herein, the middle of the display module 260 may mean a center of rotation of the hand 280.

A movement 270 may be embedded in the case 210. The movement 270 may be positioned under the display module 260. The movement 270 may be observed at the front surface of the electronic device 200. The movement 270 may be classified into a manual movement, an automatic movement, and a quartz movement. The manual movement is powered by winding a spring after a predetermined period of time passed. The automatic movement has a pendulum and is powered by automatically swing a spring through the pendulum. The pendulum of the automatic movement may have a semicircular shape or a fan shape. The quartz movement has an oscillator using quartz crystal and drives the oscillator using a battery. The movement 270 may have a shaft groove 272, into which a hand shaft 276 is inserted. The shaft groove 272 may be positioned under the shaft hole 262 of the display module 260.

The hand shaft 276 may be installed in the movement 270. The hand shaft 276 may be inserted into the middle of the movement 270. Namely, the hand shaft 276 may be inserted into the shaft groove 272 of the movement 270. Further, the hand shaft 276 may be inserted into the shaft hole 262 of the display module 260. Namely, the hand shaft 276 may pass through the shaft hole 262 of the display module 260 and may be inserted into the shaft groove 272 of the movement 270. In this instance, the hand shaft 276 may be separated from the shaft hole 262 of the display module 260 by a predetermined distance. This means that the hand shaft 276 may rotate about the shaft hole 262 of the display module 260. The hand shaft 276 may be inserted into the shaft groove 272 of the movement 270 and may receive driving power from the movement 270 to rotate. Namely, the power of the movement 270 may be transferred to the hand shaft 276 through the shaft groove 272.

The hand shaft 276 may include an external shaft 278 and an internal shaft 274. The internal shaft 274 may be a solid shaft, and the external shaft 278 may be a cylinder shaft. The internal shaft 274 may be positioned inside the external shaft 278. In other words, the external shaft 278 may surround the internal shaft 274. A rotation of the external shaft 278 may be different from a rotation of the internal shaft 274. Namely, a rotational force or a rotational angle of the external shaft 278 the movement 270 provides may be different from a rotational force or a rotational angle of the internal shaft 274 the movement 270 provides. For example, the external shaft 278 may be an hour shaft, and the internal shaft 274 may be a minute shaft. Namely, the plurality of hands 280 may be installed, and an hour hand 280 may be fixed to the hour shaft and a minute hand 280 may be fixed to the minute shaft.

The movement 270 may include an external shaft driver 273 and an internal shaft driver 277. The internal shaft driver 277 may be installed in the movement 270, so that the internal shaft driver 277 is mechanically connected to the internal shaft 274. For example, the internal shaft driver 277 may be connected to a plurality of sawteeth embedded in the movement 270 and may receive the driving power by a rotation of the plurality of sawteeth. Further, the external shaft driver 273 may be installed in the movement 270, so that the external shaft driver 273 is mechanically connected to the external shaft 278. For example, the external shaft driver 273 may be connected to the plurality of sawteeth embedded in the movement 270 and may receive the driving power by the rotation of the plurality of sawteeth. In this instance, the external shaft driver 273 may be mechanically separated from the internal shaft driver 277. Namely, a rotation angle, a rotation time, etc. by the rotation of the external shaft driver 273 may be different from a rotation angle, a rotation time, etc. by the rotation of the internal shaft driver 277.

The hand 280 may be positioned in the air gap formed between the display module 260 and the window 240. The plurality of hands 280 may be installed. The plurality of hands 280 may be positioned in the air gap. One of the plurality of hands 280 may be inserted into the external shaft 278, and other of the plurality of hands 280 may be inserted into the internal shaft 274. A length of one of the plurality of hands 280 may be longer or shorter than a length of other of the plurality of hands 280. Further, a width of one of the plurality of hands 280 may be greater or less than a width of other of the plurality of hands 280. In other words, the one and the other of the plurality of hands 280 may be differentiated from each other with the naked eye. For example, one of the plurality of hands 280 may be the hour hand 280, and other of the plurality of hands 280 may be the minute hand 280. Further, other of the plurality of hands 280 may be the second hand 280.

The power supply unit 190 may be embedded in the case 210 and may be positioned under the movement 270. The power supply unit 190 may directly or indirectly supply the electric power to the movement 270 or the display module 260. A frame 215 may be provided inside the case 210 for the structural stability of the components, which was described above or will be described later. The frame 215 may be positioned around the components and may support, fix, or contact the components.

A printed circuit board (PCB) 290 may be embedded in the case 210. The PCB 290 may supply the electric power received from the power supply unit 190 to the display module 260 or may control the display module 260. The PCB 290 may be electrically connected to the window 240 and the display module 260 and may display predetermined information on the display module 260 based on information input from the window 240. The PCB 290 may also control the movement 270. The PCB 290 may include the controller 180.

A crown 295 may be positioned on one side of the case 210. The crown 295 may rotate in a groove formed on one side of the case 210. The crown 295 may be mechanically connected to the movement 270 through a gear box 275. As the crown 295 rotates, the hand 280 may rotate. Namely, the crown 295 and the movement 270 may be interlocked.

Figure 7:
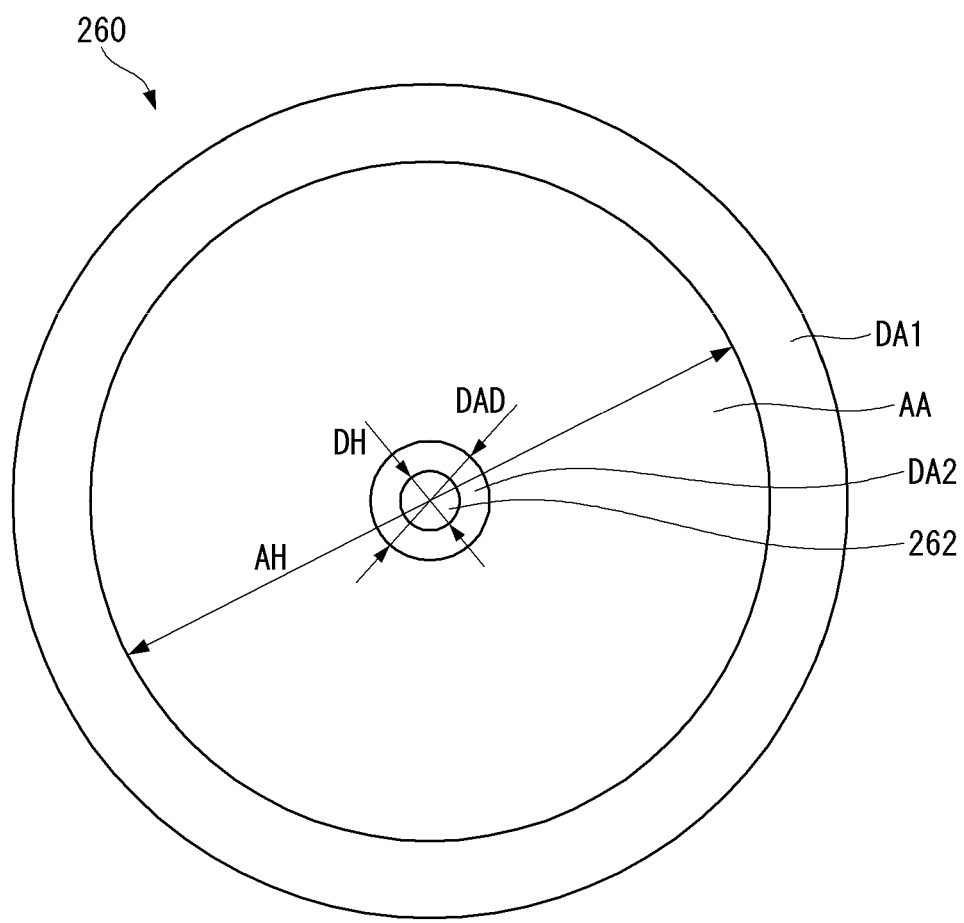
FIGS. 7 and 8 show examples of a front surface of a display module according to an exemplary embodiment of the invention.
Figure 8:
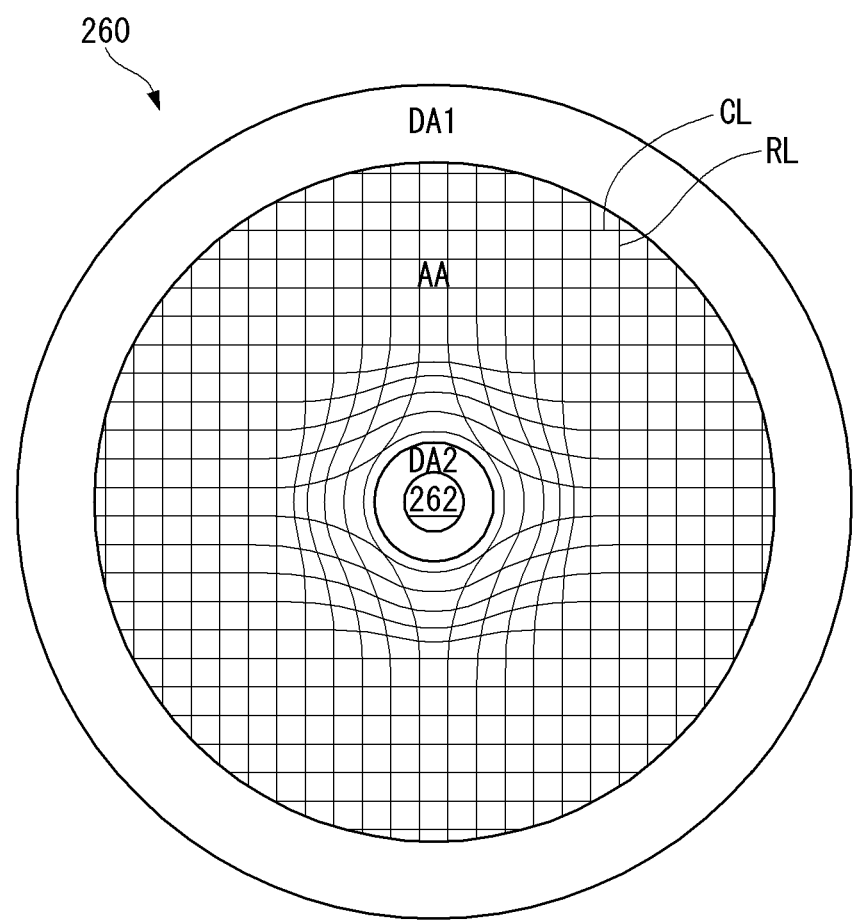

FIGS. 7 and 8 show examples of a front surface of the display module according to the embodiment of the invention.

Referring to FIG. 7, the display module 260 may have an active area AA and a deactive area DA. The active area AA may be a screen display area, and the deactive area DA may be an area, in which the screen is not displayed. The active area AA may be entirely circular in shape. The deactive area DA may be referred to as a bezel. For example, a diameter AH of the active area AA may be about 32 mm to 33 mm, and a diameter DH of the shaft hole 262 may be about 1.8 mm. The deactive area DA may include a first deactive area DA1 and a second deactive area DA2. The first deactive area DA1 may be positioned in an outer portion or at an edge of the display module 260, and the second deactive area DA2 may be positioned in the middle of the display module 260. In this instance, the shaft hole 262 may be formed in the middle of the display module 260, and the second deactive area DA2 may be positioned along the perimeter of the shaft hole 262. Namely, the second deactive area DA2 may be due to the formation of the shaft hole 262. A diameter DAD of the second deactive area DA2 may be about 5 mm, for example.

Referring to FIG. 8, the display module 260 may have an active area AA and a deactive area DA. The deactive area DA may include a first deactive area DA1 and a second deactive area DA2. The first deactive area DA1 may be positioned in an outer portion or at an edge of the display module 260, and the second deactive area DA2 may be positioned in the middle of the display module 260. The middle of the display module 260 may be a perimeter or an edge of the shaft hole 262.

The display module 260 may include electric lines RL and CL in the active area AA. The electric lines RL and CL may be thin film transistor (TFT) lines. The electric lines RL and CL may include rows RL and columns CL. The rows RL and the columns CL may cross each other. In this instance, the electric lines RL and CL may not be formed in the second deactive area DA2. This may mean that the electric lines RL and CL are formed while avoiding the second deactive area DA2.

In another terms, the electric lines RL and CL may perform a switching function in the active area AA. A switching operation may be performed at coordinates of a matrix formed through the crossing of the rows RL and the columns CL. When the shaft hole 262 is formed in the middle of the display module 260, the matrix coordinates cannot be electrically formed at a location of the shaft hole 262. This is because the shaft hole 262 may be formed as a physically empty space. More specifically, when the shaft hole 262 is formed in the middle of the display module 260, the second deactive area DA2 may be formed around the shaft hole 262. Hence, the electrical matrix coordinates cannot be formed around the shaft hole 262. In other words, the TFT cannot be formed in the shaft hole 262 or the second deactive area DA2.

Because the electric lines RL and CL are formed while avoiding the shaft hole 262 or the second deactive area DA2, current flowing through the electric lines RL and CL may flow throughout the display module 260 without cutoff of the current due to the shaft hole 262 or the second deactive area DA2.

Figure 9:
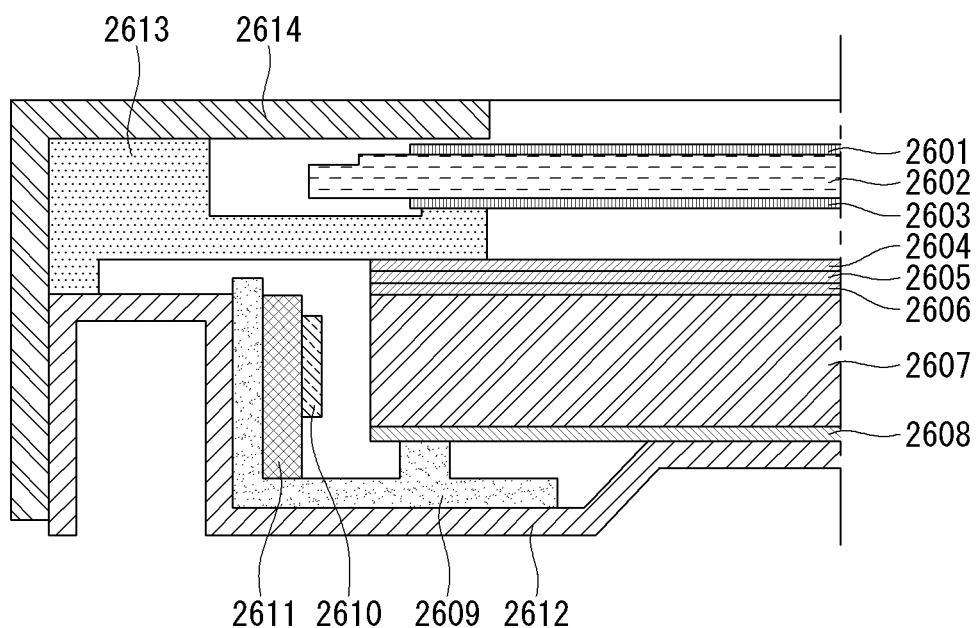
FIG. 9 shows an example of a cross section of a display module according to an exemplary embodiment of the invention.
Figure 10:
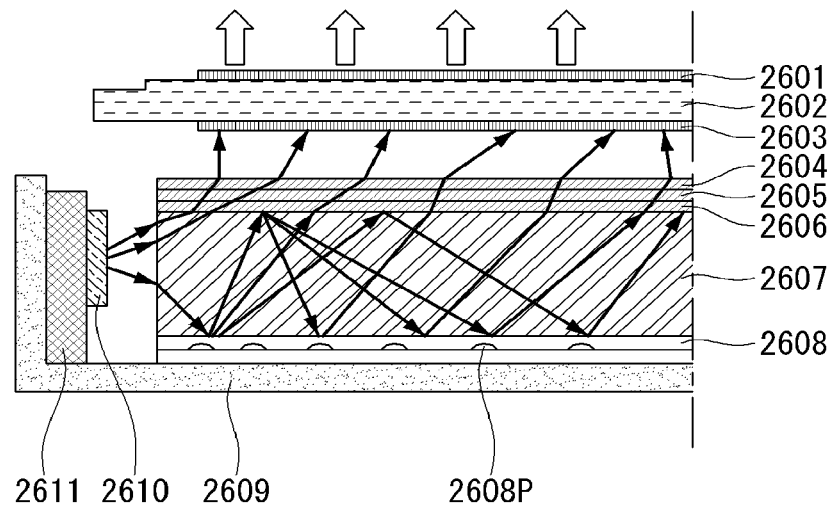
FIGS. 10 and 11 show examples of an optical path of a display module according to an exemplary embodiment of the invention.

FIG. 9 shows an example of a cross section of the display module according to the embodiment of the invention. FIG. 10 shows an example of an optical path of the display module according to the embodiment of the invention.

A display panel 2602 may be a liquid crystal display (LCD) panel. The display panel 2602 may include polarizing layers 2601 and 2603 on an upper surface and/or a lower surface of the display panel 2602. The display panel 2602 may include a first substrate and a second substrate, and a gap between the first substrate and the second substrate may be filled with liquid crystals. Color filters may be formed on one surface of the first substrate, and TFTs may be formed on one surface of the second substrate. The display panel 2602 may control a display area by turning on or off the TFTs. The polarizing layers 2601 and 2603 may be attached to external surface(s) of the first substrate and/or the second substrate.

A backlight unit may provide light for the display panel 2602 at one side of the display panel 2602. The backlight unit may provide light for the display panel 2602 from the rear or a lower surface of the display panel 2602. The rear or the lower surface of the display panel 2602 means the side or the surface opposite the surface of the display panel 2602 observed from the outside of the electronic device. The backlight unit may include, for example, a light source 2610, a light guide plate 2607, and optical layers 2604, 2605, and 2606. All of the illustrated components of the backlight unit is not a requirement, and that greater or fewer components may alternatively be implemented.

The light source 2610 may be positioned on the side of the backlight unit. A direction of light the light source 2610 provides may be different from a direction of light the backlight unit provides for the display panel 2602. For example, the backlight unit may provide light for the display panel 2602 from the rear of the display panel 2602. In this instance, the light source 2610 may provide light in a direction vertical to (or in a direction crossing) the direction of light provided by the backlight unit. Namely, light provided by the light source 2610 changes its path inside the backlight unit and may finally travel toward the display panel 2602. In this instance, the light guide plate 2607 may change a path of light provided by the light source 2610. The light source 2610 may be a light emitting diode (LED) element, for example.

A flexible printed circuit board (FPCB) 2611 may be electrically connected to the light source 2610. The FPCB 2611 may supply the electric power received from the power supply unit 190 to the light source 2610 and may control a switching operation of the light source 2610. When the plurality of light sources 2610 are used, the FPCB 2611 may have a plurality of branches electrically connected to the plurality of light sources 2610.

The light guide plate 2607 may be embedded in the backlight unit. The light guide plate 2607 may be positioned in the rear of the display panel 2602. The light source 2610 may be positioned on one side of the light guide plate 2607. In this instance, the light source 2610 may be separated from the light guide plate 2607 by a predetermined distance. For example, when the backlight unit is positioned under the display panel 2602, the light guide plate 2607 may be positioned under the display panel 2602, and the light source 2610 may be positioned on the side of the light guide plate 2607. In this instance, the light guide plate 2607 may change a path of light provided by the light source 2610 and may make the light travel toward the display panel 2602.

A reflective layer 2608 may be positioned under the light guide plate 2607. The reflective layer 2608 may be positioned adjacent to a lower surface of the light guide plate 2607, or may contact the lower surface of the light guide plate 2607. The reflective layer 2608 may make light, which is incident on the inside of the light guide plate 2607 from the light source 2610, travel toward an upper part of the light guide plate 2607. The reflective layer 2608. The reflective layer 2608 may be formed by processing the lower surface of the light guide plate 2607. The reflective layer 2608 may have a pattern 2608p, so as to improve efficiency of the reflective layer 2608, which makes light incident on the inside of the light guide plate 2607 from the light source 2610 travel toward the upper part of the light guide plate 2607. The pattern 2608p may be formed in the reflective layer 2608. The pattern 2608p may be formed between the light guide plate 2607 and the reflective layer 2608 and may provide a different refractive index for the light guide plate 2607.

The optical layers 2604, 2605, and 2606 may be positioned on the light guide plate 2607. The optical layers 2604, 2605, and 2606 may be positioned adjacent to an upper surface of the light guide plate 2607 and may contact the upper surface of the light guide plate 2607. The optical layers 2604, 2605, and 2606 may focus or diffuse light emitted from the light guide plate 2607, thereby uniformly providing light for the display panel 2602. The optical layers 2604, 2605, and 2606 may include a diffuser 2606 and prisms 2604 and 2605. The diffuser 2606 may be positioned adjacent to the upper surface of the light guide plate 2607, positioned on the upper surface of the light guide plate 2607, or may contact the upper surface of the light guide plate 2607. The diffuser 2606 may evenly distribute light emitted from the light guide plate 2607. One diffuser 2606 or the plurality of diffusers 2606 may be used. The prisms 2604 and 2605 may be positioned adjacent to an upper surface of the diffuser 2606, positioned on the upper surface of the diffuser 2606, or may contact the upper surface of the diffuser 2606. The prisms 2604 and 2605 may concentrate light diffused and emitted from the diffuser 2606 in one direction. Namely, the prisms 2604 and 2605 may provide linearity, which makes light distributed by the diffuser 2606 travel toward the display panel 2602. One prism or the plurality of prisms may be used. In other words, light emitted from the light source 2610 may change its travelling direction through the light guide plate 2607 and the reflective layer 2608, may pass through the optical layers 2604, 2605, and 2606, and may be provided for the display panel 2602.

A frame 2612 may support the components of the display module 260, or may contribute to the structural stability or the coupling stability of the display module 260 by contacting or fixing the components of the display module 260. One frame 2612 or a plurality of frames 2612, 2613, and 2609 may be used.

A cover 2614 may cover at least a portion of the frame 2612 and at least a portion of the components of the display module 260 supported by the frame 2612. The cover 2614 may cover the perimeter of the display module 260, a portion of the front surface or the back surface of the display module 260, or the entire display module 260. The cover 2614 may be positioned along an outer perimeter of the display module 260.

Hence, the display panel 2602 may have a thin profile structure. The display panel 2602 may provide the screen of excellent image quality in spite of the thin profile structure of the display panel 2602. If there occurs a change in the backlight unit or the display panel 2602, the image quality of the screen provided by the display panel 2602 may change. This means that a physical change generated in the display panel 2602 or the backlight unit may result in a change in the image quality of the screen provided by the display panel 2602.

Figure 11:
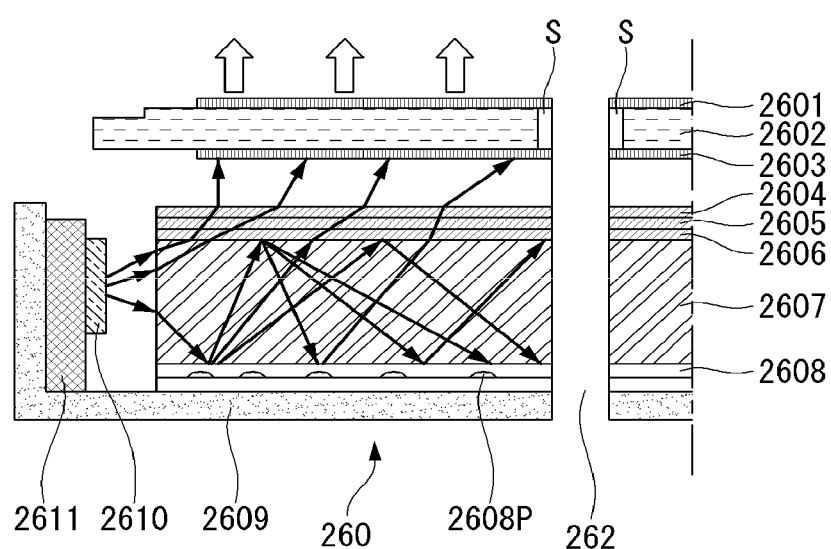
Figure 12:
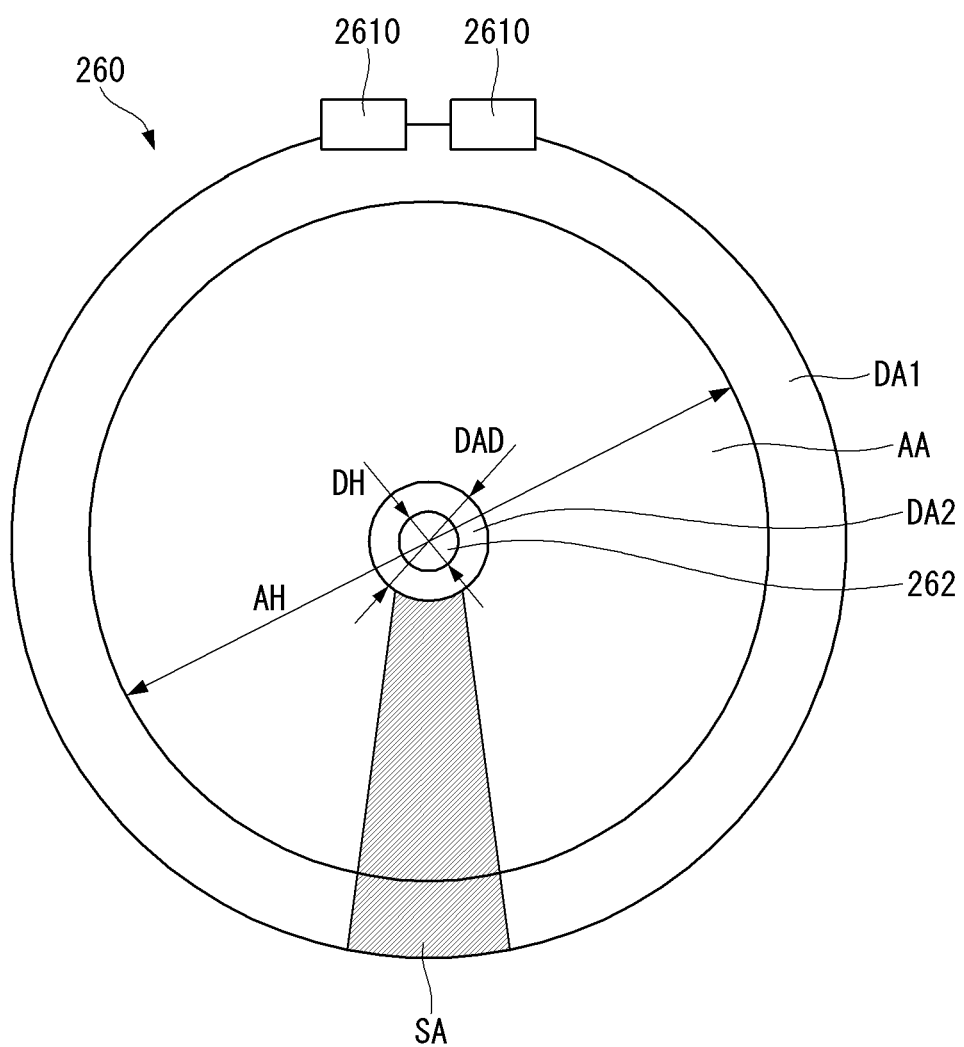
FIGS. 12 to 17 show examples of a disposition of light sources of a backlight unit according to an exemplary embodiment of the invention.
Figure 13:
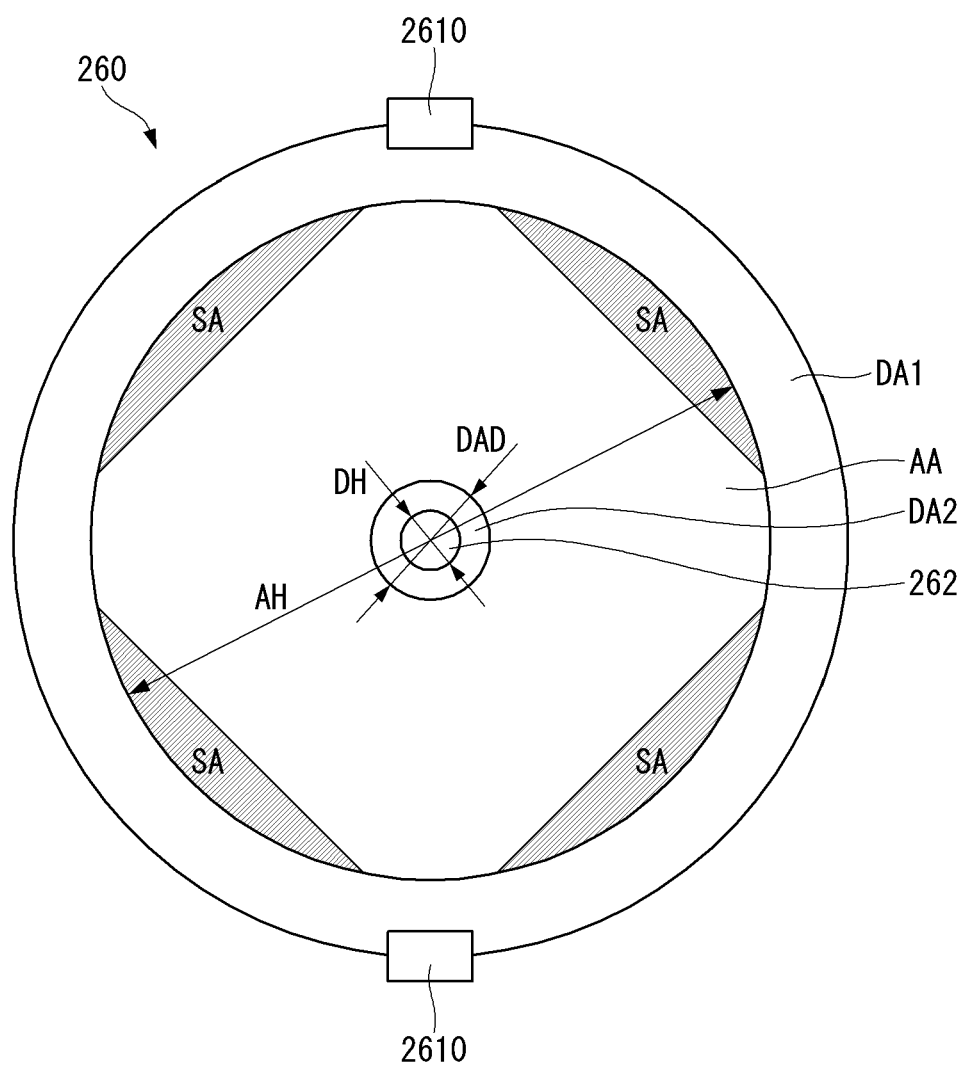

FIG. 11 shows an example of a cross section of the display module, and FIGS. 12 and 13 show an example of the front surface of the display module.

Referring to FIG. 11, the display module 260 has the shaft hole 262. The shaft hole 262 may be formed in the display panel 2602. Further, the shaft hole 262 may be formed in the backlight unit. In this instance, the shaft hole 262 formed in the backlight unit may be positioned under the shaft hole 262 formed in the display panel 2602. A sealing member S of the display panel 2602 may form a wall of the shaft hole 262. The light guide plate 2607, the reflective layer 2608, and/or the optical layers 2604, 2605, and 2606 of the backlight unit may partially disappear or may not partially exist by the shaft hole 262. Namely, this means the change in the display panel 2602 and/or the backlight unit. Thus, the change in the display panel 2602 and/or the backlight unit may result in a change in the image quality of the display module 260.

In terms of the light path, light provided by the light source 2610 may enter the light guide plate 2607. In this instance, the light entering the light guide plate 2607 may be reflected on the light guide plate 2607 by the reflective layer 2608. The light emitted on the light guide plate 2607 may travel toward the display panel 2602 by the optical layers 2604, 2605, and 2606. In this instance, a path of a portion of the light, which is provided by the light source 2610 and enters the light guide plate 2607, may change due to the shaft hole 262. Namely, the path of the light, which is provided by the light source 2610, enters the light guide plate 2607, and travels toward the display panel 2602, may be blocked. In other words, a shadow area SA may be formed in the display module 260. The shadow area SA leads to a reduction in the image quality of the display module 260.

Referring to FIG. 12, the display module 260 has the shaft hole 262, and the light sources 2610 may be formed on one side of the display module 260. A path of light provided by the light sources 2610 may be blocked by the shaft hole 262. Hence, a shadow area SA may be formed in a portion of the display module 260. The shadow area SA leads to a reduction in the image quality of the display module 260.

Referring to FIG. 13, the display module 260 has the shaft hole 262, and the light sources 2610 may be formed at both sides of the display module 260. More specifically, the light sources 2610 may be formed at both sides of the display module 260 with respect to the shaft hole 262. When the light sources 2610 are positioned at both sides of the display module 260, a path of light provided by the light sources 2610 may be blocked by the shaft hole 262. Hence, a shadow area SA may be formed in a portion of the display module 260. The shadow area SA leads to a reduction in the image quality of the display module 260. In this instance, the shadow area SA of FIG. 12 may be different from the shadow area SA of FIG. 13. Namely, the shadow area SA cannot be improved by simply changing a location of the light sources 2610 included in the display module 260. In other words, a change in the shadow area SA depending on a change in the arrangement of the light sources 2610 cannot be easily predicted.

FIGS. 14 to 17 show examples of a disposition of light sources of the backlight unit according to the embodiment of the invention. More specifically, FIGS. 14 to 17 show examples of a front surface of the display module. It is described that the front surface of the display module 260 has a 12-sided polygon shape (i.e., a dodecagonal shape) for the sake of brevity and ease of reading. More specifically, the front surface of the display module 260 may have an active area AA and a deactive area DA. The active area AA may be a screen display area, and the deactive area DA may be an area, in which the screen is not displayed. The active area AA may be entirely circular in shape. An appearance of the deactive area DA may have entirely the dodecagonal shape. The deactive area DA may be referred to as a bezel. The light sources 2610 may be disposed in the deactive area DA. The deactive area DA may have first to twelfth sides and may correspond to the dodecagon. The twelfth side may be at twelve o'clock on the front surface of the display module 260. The first side may be at one o'clock on the front surface of the display module 260, and the eleventh side may be at eleven o'clock on the front surface of the display module 260. For example, a diameter DH of the shaft hole 262 may be about 1 mm to 1.8 mm. For example, a diameter AH of the active area AA of the display module 260 may be about 32 mm to 33 mm.

Figure 14:
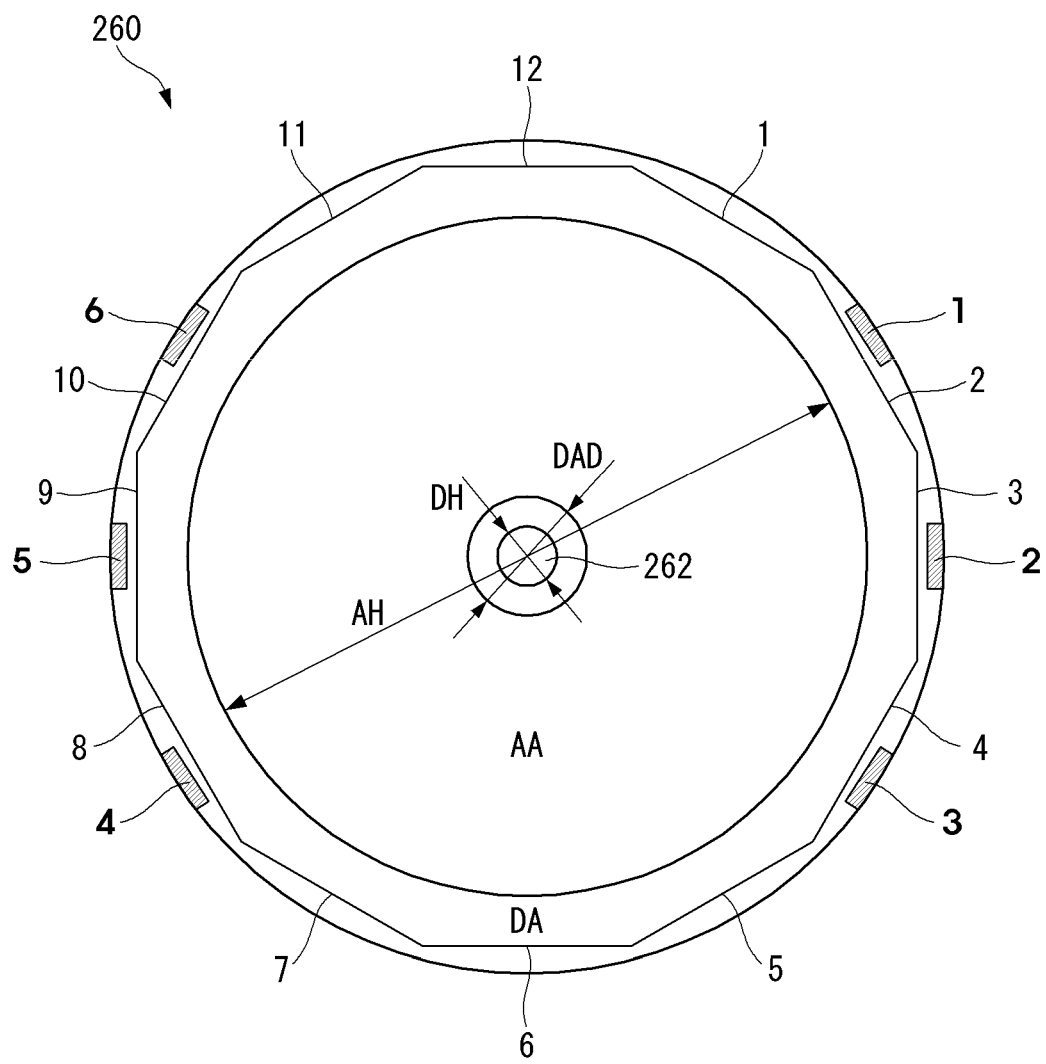

Referring to FIG. 14, the display module 260 may include the plurality of light sources. A first light source may be positioned on the second side, and a second light source may be positioned on the third side. A third light source may be positioned on the fourth side, and a fourth light source may be positioned on the eighth side. A fifth light source may be positioned on the ninth side, and a sixth light source may be positioned on the tenth side.

The first to third light sources may be positioned adjacent to the side of the light guide plate 2607, or may be sequentially positioned along the perimeter of the display module 260. Further, the fourth to sixth light sources may be positioned adjacent to the side of the light guide plate 2607, or may be sequentially positioned along the perimeter of the display module 260. The fourth to sixth light sources may be positioned opposite the first to third light sources. In other words, the first to third light sources may be symmetrical to the fourth to sixth light sources with respect to the shaft hole 262.

The first to third light sources may be positioned within the range of about 120° with respect to the shaft hole 262, and the fourth to sixth light sources may be positioned within the range of about 120° with respect to the shaft hole 262. In another example, the first to third light sources may be positioned within the range of about 90° with respect to the shaft hole 262, and the fourth to sixth light sources may be positioned within the range of about 90° with respect to the shaft hole 262. The first to third light sources may be positioned opposite the fourth to sixth sources. In other words, the first to third light sources may be symmetrical to the fourth to sixth light sources with respect to the shaft hole 262.

The shadow area SA may be prevented from being formed in the display module 260 through the above-described arrangement of the plurality of light sources. Namely, as described above, the arrangement of the plurality of light sources can greatly improve the image quality of the display module 260.

Figure 15:
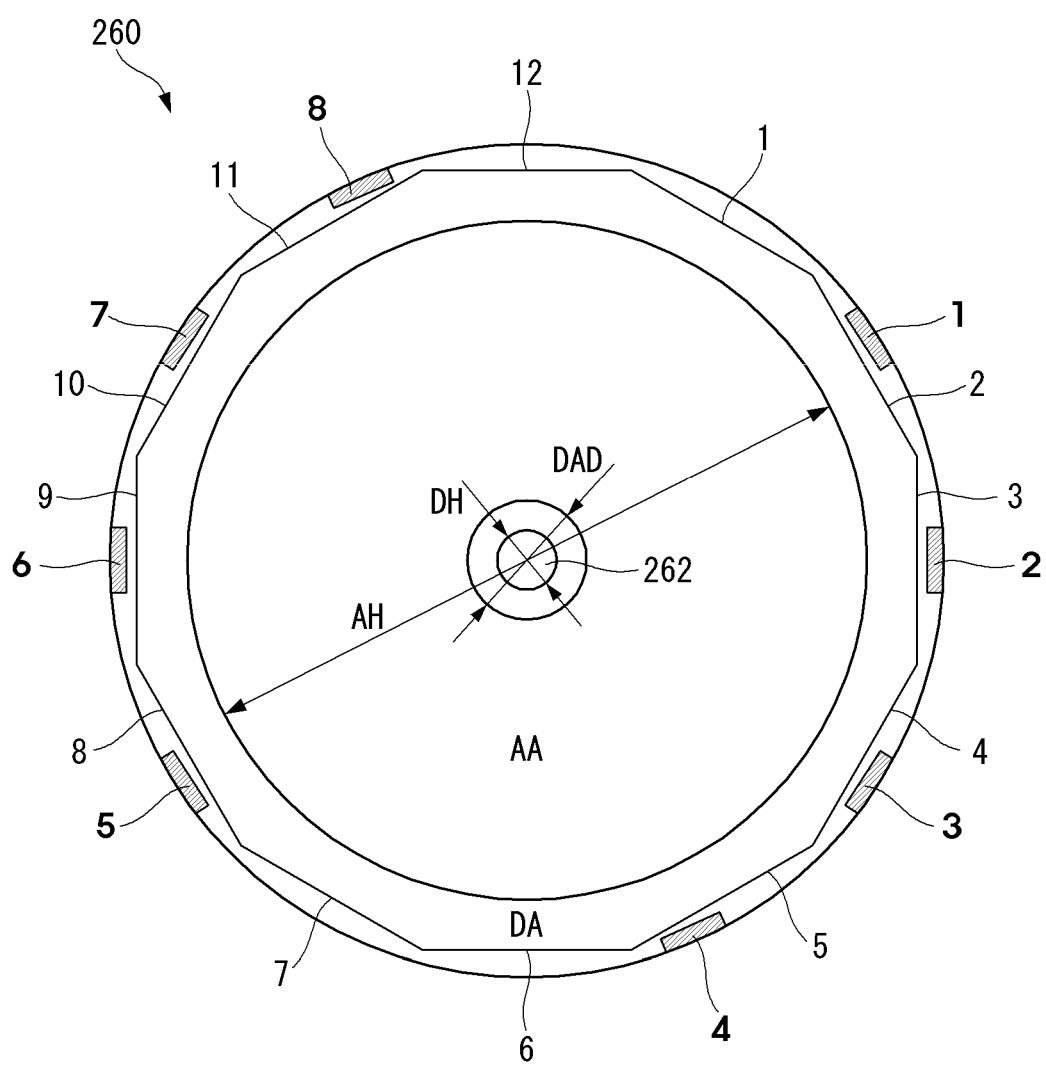

Referring to FIG. 15, the display module 260 may include the plurality of light sources. A first light source may be positioned on the second side, and a second light source may be positioned on the third side. A third light source may be positioned on the fourth side, and a fourth light source may be positioned on the fifth side. A fifth light source may be positioned on the eighth side, and a sixth light source may be positioned on the ninth side. A seventh light source may be positioned on the tenth side, and an eighth light source may be positioned on the eleventh side.

The shadow area SA may be prevented from being formed in the display module 260 through the above-described arrangement of the plurality of light sources. Namely, as described above, the arrangement of the plurality of light sources can greatly improve the image quality of the display module 260.

Figure 16:
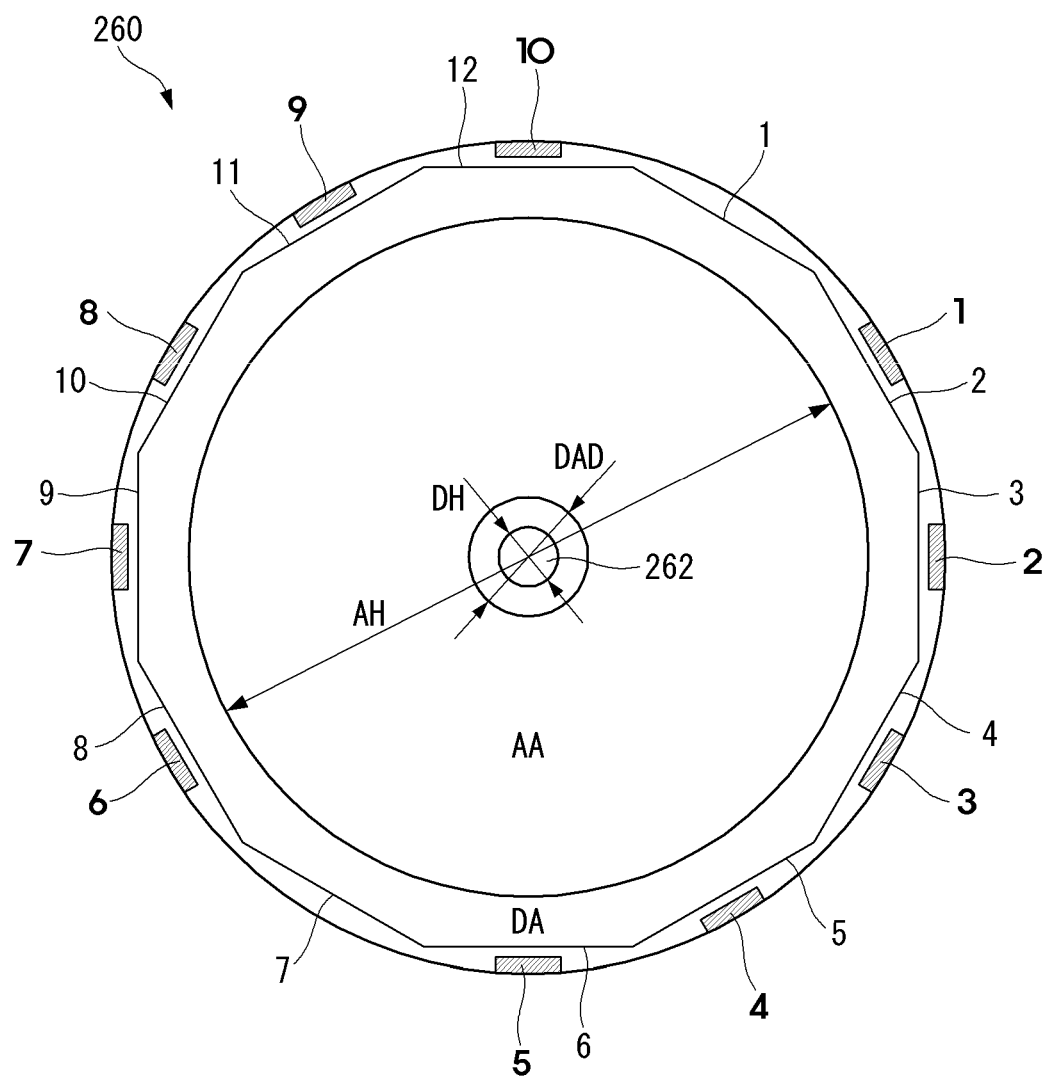

Referring to FIG. 16, the display module 260 may include the plurality of light sources. A first light source may be positioned on the second side, and a second light source may be positioned on the third side. A third light source may be positioned on the fourth side, and a fourth light source may be positioned on the fifth side. A fifth light source may be positioned on the sixth side, and a sixth light source may be positioned on the eighth side. A seventh light source may be positioned on the ninth side, and an eighth light source may be positioned on the tenth side. A ninth light source may be positioned on the eleventh side, and a tenth light source may be positioned on the twelfth side.

The shadow area SA may be prevented from being formed in the display module 260 through the above-described arrangement of the plurality of light sources. Namely, as described above, the arrangement of the plurality of light sources can greatly improve the image quality of the display module 260.

Figure 17:
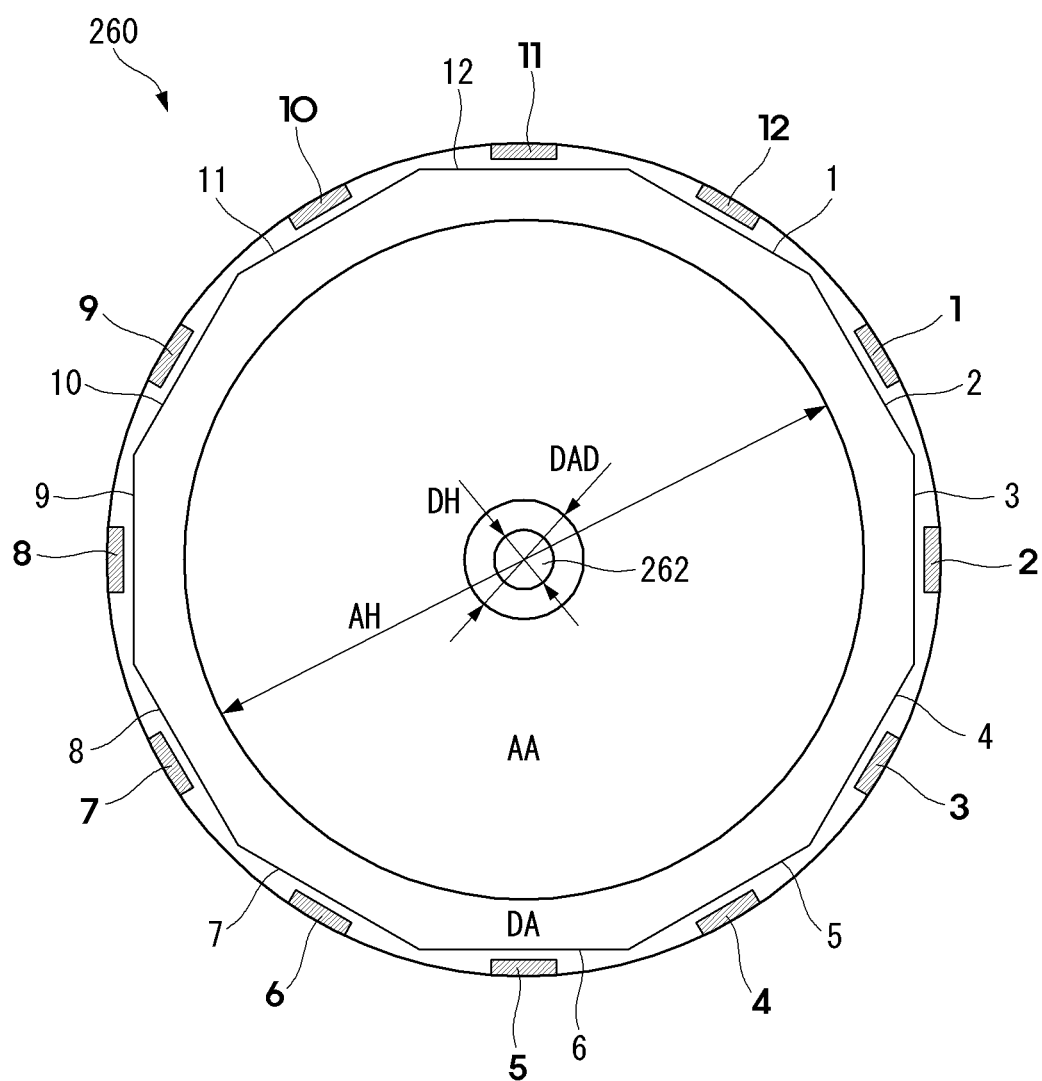

Referring to FIG. 17, the display module 260 may include the plurality of light sources. A first light source may be positioned on the second side, and a second light source may be positioned on the third side. A third light source may be positioned on the fourth side, and a fourth light source may be positioned on the fifth side. A fifth light source may be positioned on the sixth side, and a sixth light source may be positioned on the seventh side. A seventh light source may be positioned on the eighth side, and an eighth light source may be positioned on the ninth side. A ninth light source may be positioned on the tenth side, and a tenth light source may be positioned on the eleventh side. An eleventh light source may be positioned on the twelfth side, and a twelfth light source may be positioned on the first side.

The shadow area SA may be prevented from being formed in the display module 260 through the above-described arrangement of the plurality of light sources. Namely, as described above, the arrangement of the plurality of light sources can greatly improve the image quality of the display module 260.

Figure 18:
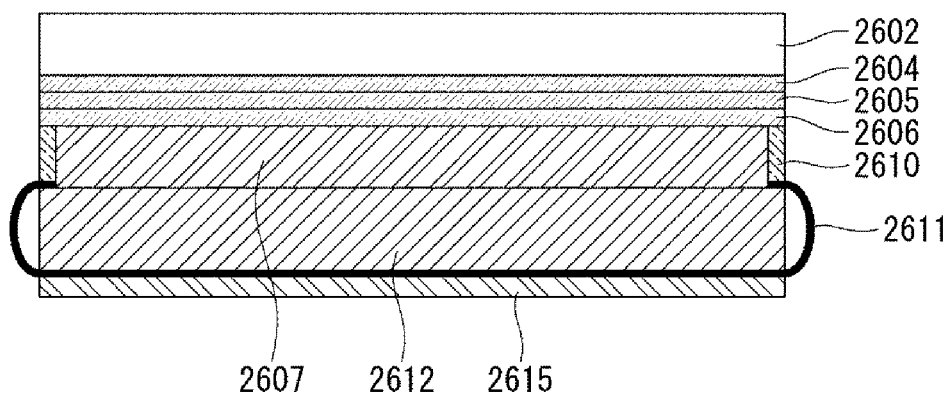
FIG. 18 shows an example of a display module according to an exemplary embodiment of the invention.
Figure 19:
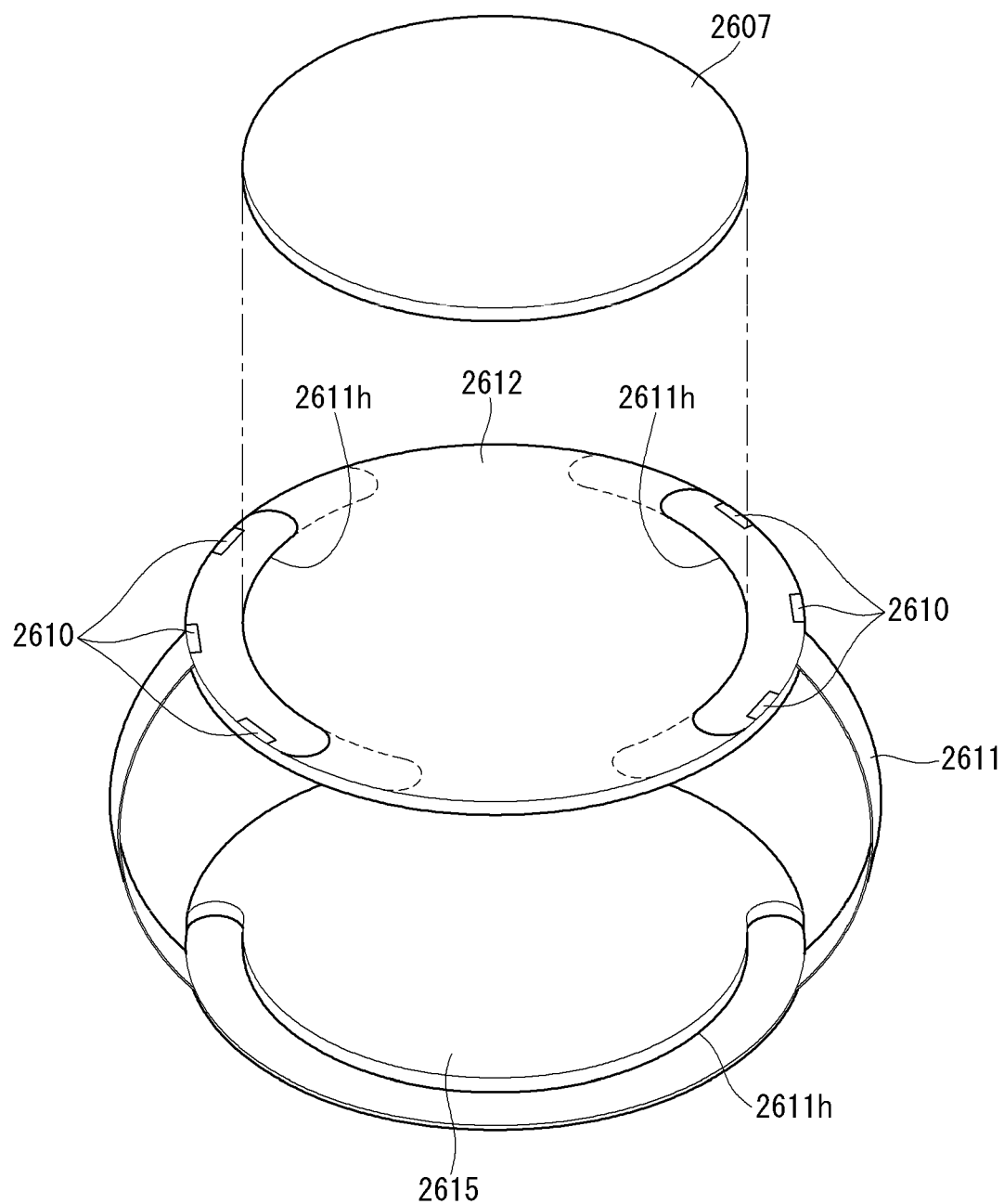
FIG. 19 shows an example of a structure of a flexible printed circuit board (FPCB) of a backlight unit according to an exemplary embodiment of the invention.

FIG. 18 shows an example of the display module according to the embodiment of the invention. FIG. 19 shows an example of a structure of a flexible printed circuit board (FPCB) of the backlight unit according to the embodiment of the invention.

Referring to FIG. 18, the display module 260 may include the display panel 2602. The display panel 2602 may be a LCD panel. The backlight unit may be provided in the rear of the display panel 2602. The backlight unit may include the components which will be described below. The optical layers 2604, 2605, and 2606 may be positioned in the rear of the display panel 2602. The optical layers 2604, 2605, and 2606 may be positioned adjacent to the back surface of the display panel 2602 or may be positioned on the back surface of the display panel 2602. The optical layers 2604, 2605, and 2606 may have a plurality of layers. The light guide plate 2607 may be positioned in the rear of the optical layers 2604, 2605, and 2606. The light guide plate 2607 may be positioned adjacent to back surfaces of the optical layers 2604, 2605, and 2606 or may be positioned on the back surfaces of the optical layers 2604, 2605, and 2606. The light guide plate 2607 may be attached to one surface of each of the optical layers 2604, 2605, and 2606. The light guide plate 2607 may be supported by the frame 2612. The light source 2610 may be provided at the side of the light guide plate 2607. The light source 2610 may be provided at both sides of the light guide plate 2607. The plurality of light sources 2610 may be provided at both sides of the light guide plate 2607. For example, the three light sources 2610 may be provided at one side of the light guide plate 2607, and the three light sources 2610 may be provided at the other side of the light guide plate 2607.

A plate 2615 may be provided in the rear of the frame 2612. The FPCB 2611 may be positioned between the plate 2615 and the frame 2612 and may be electrically connected to the light source 2610. For example, the FPCB 2611 may be positioned between the plate 2615 and the frame 2612, and one side or both sides of the FPCB 2611 may extend from the FPCB 2611 to the light source 2610.

Referring to FIG. 19, the frame 2612 may be provided in the rear of the light guide plate 2607. The frame 2612 may be positioned adjacent to the back surface of the light guide plate 2607. The frame 2612 may be positioned on the lower surface of the light guide plate 2607. The frame 2612 may have a predetermined thickness. The plate 2615 may be provided in the rear of the frame 2612. The plate 2615 may be positioned adjacent to the lower surface of the frame 2612 or may be positioned on the lower surface of the frame 2612. The plate 2615 may have a predetermined thickness. The plate 2615 may have an FPCB groove 2611*h*. The frame 2612 may have an FPCB groove 2611*h*. The FPCB groove 2611*h* may be formed along the perimeter of the frame 2612 or the plate 2615. The FPCB groove 2611*h* may be formed in an outer portion of the frame 2612 or the plate 2615. The FPCB groove 2611*h* may be formed by removing a portion of the frame 2612 or a portion of the plate 2615.

The FPCB 2611 may have a shape corresponding to the FPCB groove 2611*h*. The fact that the FPCB 2611 corresponds to the FPCB groove 2611*h* means that the FPCB 2611 may be entirely positioned in the FPCB groove 2611*h*. For example, the almost entire portion of the FPCB 2611 may be positioned in the FPCB groove 2611*h* formed in the plate 2615, and the remaining portion of the FPCB 2611 may be positioned in the FPCB groove 2611*h* formed in the frame 2612. The FPCB 2611 may be electrically connected to the light sources 2610. Hence, a thickness of the display module 260 can be smaller. The fact that the thickness of the display module 260 is smaller may mean that it is difficult to design or arrange the components of the display module 260. The above configuration of the display module 260 described with reference to FIG. 19 can solve such a difficulty.

FIGS. 20 to 26 show examples of the display unit of the electronic device according to the embodiment of the invention.

Figure 20:
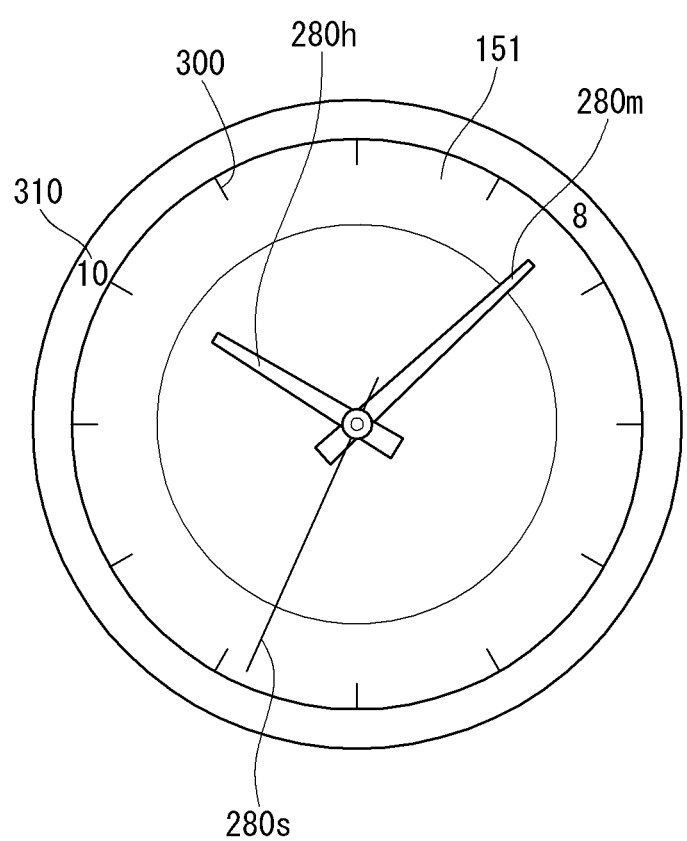
FIGS. 20 to 26 show examples of a display unit of an electronic device according to an exemplary embodiment of the invention.

Referring to FIG. 20, the electronic device according to the embodiment of the invention may provide a clock mode. The display unit 151 may display a clock index 300. The display unit 151 may provide time information while an hour hand 280*h*, a minute hand 280*m*, or a second hand 280*s* rotates on the clock index 300. The display unit 151 may display a dial 310. The dial 310 may be matched to the clock index 300. The dial 310 may be Arabic numeral. Only the numeral, at which the hand 280 is positioned, may be activated. For example, when it is ten eight, the dial 310 of the clock index 300 the hour hand 280*h* indicates may display "10", and the dial 310 of the clock index 300 the minute hand 280m indicates may display "8".

Figure 21:
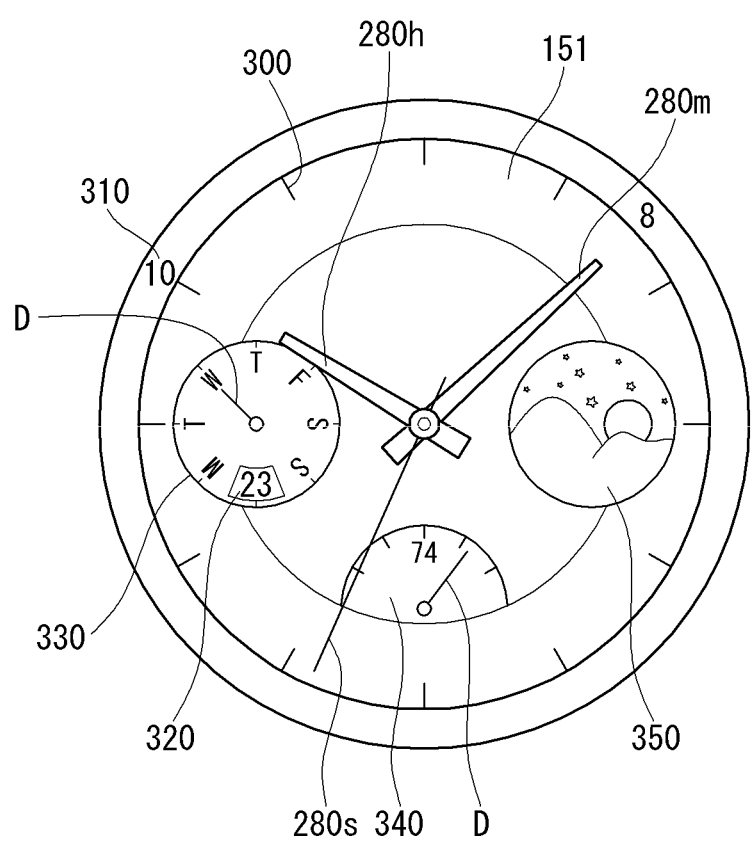

Referring to FIG. 21, the electronic device according to the embodiment of the invention may provide the clock mode. The display unit 151 may display data information 320, day information 330, climate information 340, or am/pm information 350. The data information 320 may display month information, display day information, or display the month information or the day information. The climate information 340 may display a temperature, humidity, a wind speed, expected precipitation, a special weather report, and the like. The am/pm information 350 may display sun or moon based on time. In this instance, the display unit 151 may display a digital hand D, so as to easily indicate the information.

Figure 22:
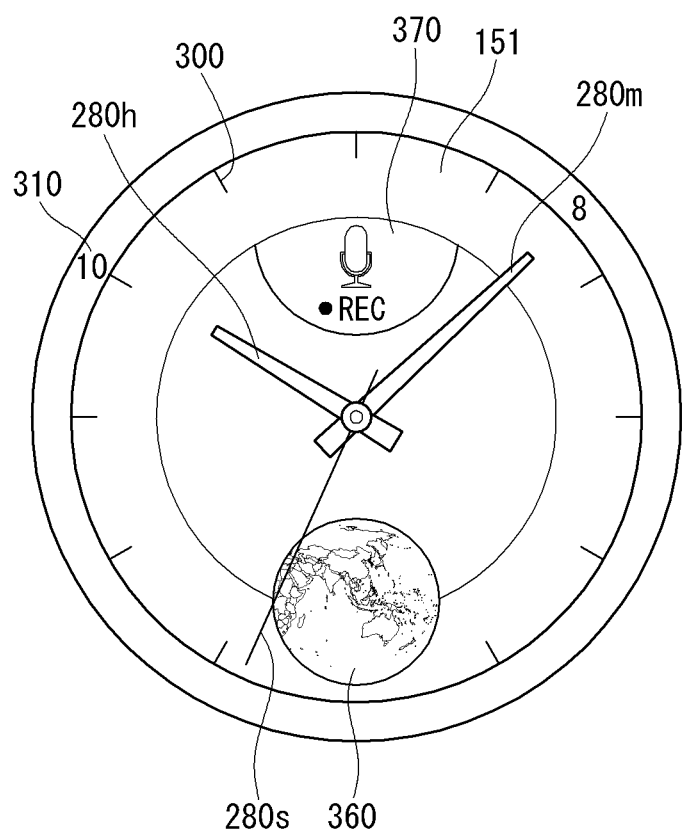

Referring to FIG. 22, the electronic device according to the embodiment of the invention may provide the clock mode. The display unit 151 may display time of the world. The time of the world may display time of the corresponding country while a map of the corresponding country is displayed. The time of the world may display time of the corresponding country while the corresponding country is displayed on a map of the world 360.

The electronic device according to the embodiment of the invention may provide a recording mode. When the recording mode is activated, the display unit 151 may display a recording on/off button 370. The user may touch the recording on/off button 370 and may perform the recording.

Figure 23:
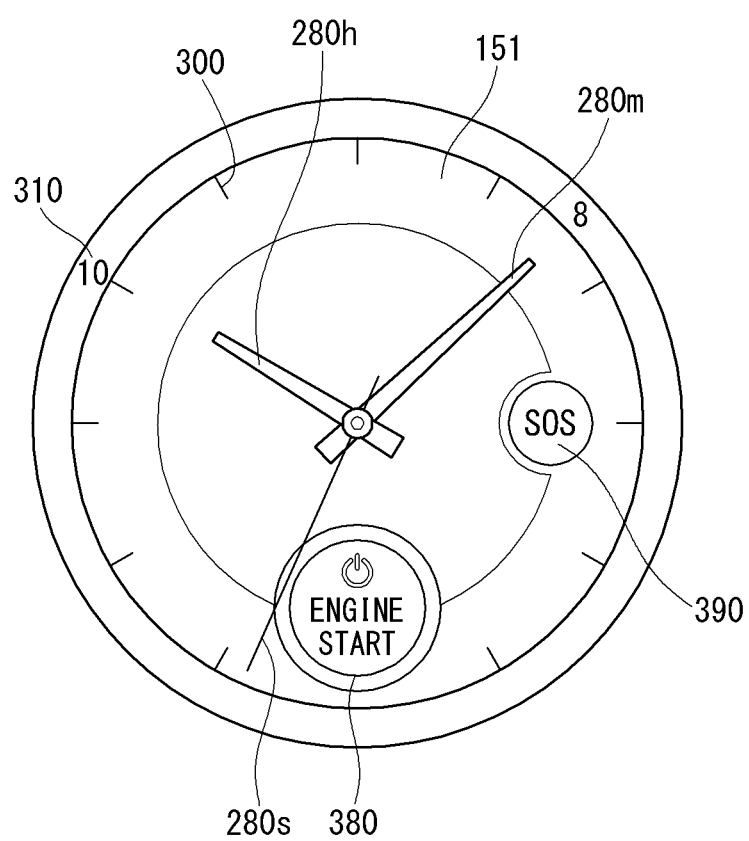

Referring to FIG. 23, the electronic device according to the embodiment of the invention may provide a remote control mode. The display unit 151 may display a vehicle start button 380. When the user intends to start his/her vehicle, the user may touch the vehicle start button 380 and may remotely start his/her own vehicle. The display unit 151 may display fuel efficiency of the vehicle. The electronic device may interwork with the user's vehicle through the local area communication.

The electronic device according to the embodiment of the invention may provide a rescue request mode. The display unit 151 may display a rescue button 390. When the user runs into danger, the user may touch the rescue button 390 and may remotely inform about his/her own danger. In this instance, dangerous information may be transmitted to acquaintances or governmental institution.

Figure 24:
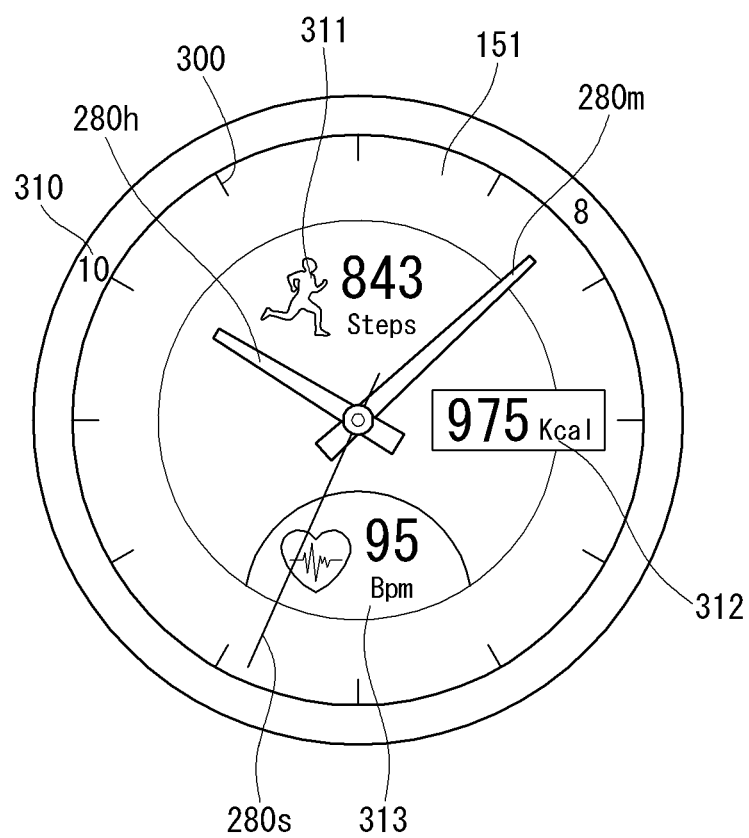

Referring to FIG. 24, the electronic device according to the embodiment of the invention may provide an exercise mode. The display unit 151 may display an amount of user's exercise 311, a heart rate 313, a consumed energy 312, and the like.

Figure 25:
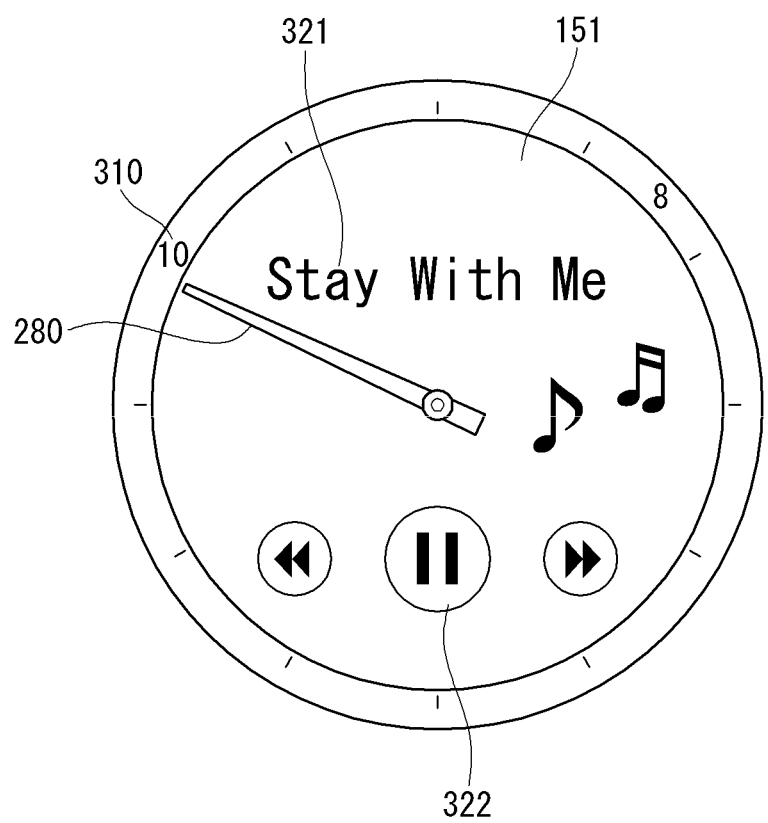

Referring to FIG. 25, the electronic device according to the embodiment of the invention may provide a music mode. The display unit 151 may display a title 321, a singer, playback time, a playback mode 322 of selected music contents, and the like. In this instance, the hand 280 may rotate depending on the playback time. The playback time may be displayed by a movement of the hand 280, displayed by a bar extending by a predetermined length, or displayed by a movement of the hand 280 and the bar extending by the predetermined length. Further, the electronic device may simultaneously provide the music mode and the clock mode. The clock mode may be performed by displaying corresponding time with the dial 310. For example, when the music mode of the electronic device is activated, the dial 310 the hour hand 280h indicates may display "10" and the dial 310 the minute hand 280m indicates may display "9", so as to provide the clock mode, in which it is ten nine.

Figure 26:
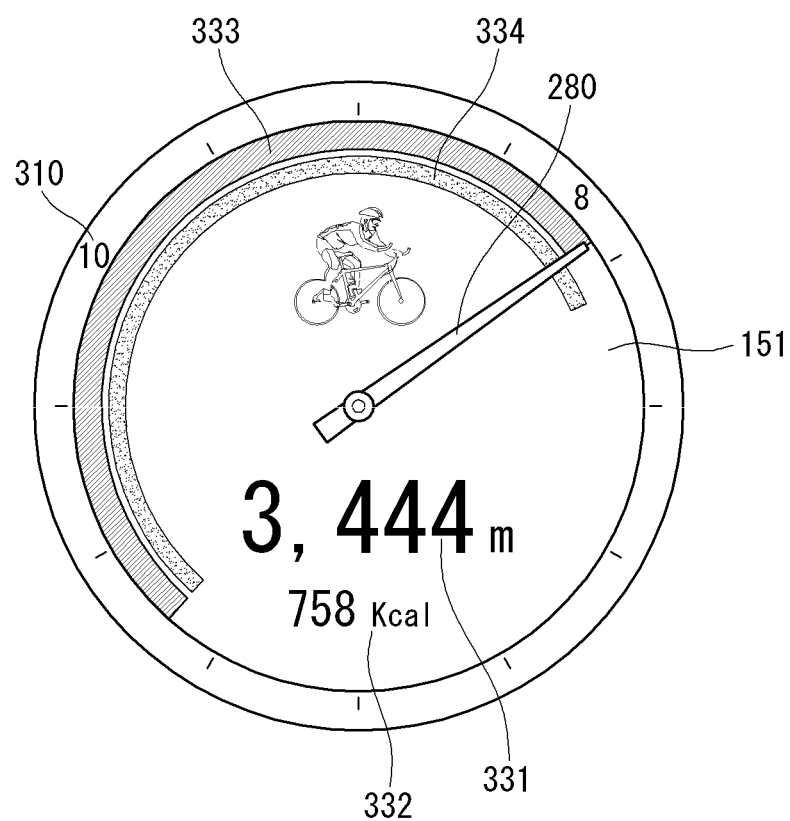

Referring to FIG. 26, the electronic device according to the embodiment of the invention may provide an exercise mode. The display unit 151 may display an exercise time 333, an exercise distance 331, an amount of exercise 334, a consumed energy 332, and the like. In this instance, at least one of the displayed informations may be displayed as an amount of rotation by positioning the hour hand 280h and/or the minute hand 280m at the same location (i.e., as one body). For example, the display unit 151 may display a rotation angle 333, by which the hand 280 of one body rotates from an original location. Further, the electronic device may simultaneously provide the exercise mode and the clock mode. The clock mode may be performed by displaying corresponding time with the dial 310. For example, when the exercise mode of the electronic device is activated, the dial 310 the hour hand 280h indicates may display "10" and the dial 310 the minute hand 280m indicates may display "9", so as to provide the clock mode, in which it is ten nine.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An electronic device comprising:
a display module having a perimeter, a front surface, and a back surface, the display module comprising:
an opening extending from the back surface of the display module to the front surface of the display module;
a plurality of first light sources disposed along a first portion of the perimeter of the display module;
a plurality of second light sources positioned opposite the plurality of first light sources and disposed along a second portion of the perimeter of the display module;
a display panel filled with liquid crystal;
a light guide plate behind the display panel;
a circular frame positioned behind the light guide plate;
a rear plate behind the circular frame, the circular frame positioned between the rear plate and the light guide plate; and
a flexible printed circuit board (FPCB) electrically connected to the plurality of first and second light sources,
a shaft having a first end and a second end, the shaft rotatably inserted into the opening of the display module;
a movement behind the display module, the movement being connected to the first end of the shaft, wherein the movement is configured to provide a rotational force to the shaft;
a window in front of the display module, the window being separate from the display module;

at least one hand configured to be positioned between the display module and the window and fixed to the second end of the shaft; and a FPCB groove formed on at least one of the circular frame and the rear plate, wherein the FPCB groove is positioned between the circular frame and the rear plate, and wherein the FPCB groove accommodates the FPCB.

2. The electronic device of claim 1, wherein the plurality of first light sources and the plurality of second light sources are symmetrically arranged with respect to the opening of the display module.

3. The electronic device of claim 1, wherein the plurality of first light sources is arranged in an arc of about 120° in length with respect to the opening of the display module, and wherein the plurality of second light sources is arranged in an arc of about 120° in length with respect to the opening of the display module and opposite the plurality of first light sources.

4. The electronic device of claim 1 further comprising:

a light guide plate located behind the display panel;

wherein the plurality of first light sources comprises at least three light sources sequentially positioned adjacent to a peripheral edge of the light guide plate, and wherein the plurality of second light sources comprises at least three light sources positioned opposite the plurality of first light sources such that the opening of the display module is interposed between the plurality of the first light sources and the plurality of the second light sources, the plurality of second light sources being sequentially positioned adjacent to the peripheral edge of the light guide plate.

5. The electronic device of claim 1, wherein the light guide plate is circular, wherein the circular frame has a diameter greater than a diameter of the light guide plate, wherein at least a portion of an outer perimeter of the rear plate has been removed.

6. The electronic device of claim 5, the flexible printed circuit board further comprising a first portion and a second portion, wherein the first portion of the flexible printed circuit board extends toward the light guide plate and onto a surface of the circular frame adjacent to one side of the light guide plate, and the second portion of the flexible printed circuit board extends toward the light guide plate and onto the surface of the circular frame adjacent to a second side of the light guide plate, wherein the plurality of first light sources is electrically connected to the first portion side of the flexible printed circuit board, and wherein the plurality of second light sources is electrically connected to the second portion of the flexible printed circuit board.

7. The electronic device of claim 1, the display module further comprising a display panel filled with liquid crystals, the display panel comprising a sealing member adjacent the opening of the display module.

8. The electronic device of claim 1, the display module further comprising an active area, a first deactive area formed in an outer portion of the front surface of the display module and a second deactive area formed in the middle of the front surface of the display module, wherein the opening of the display module is located in the second deactive area.

9. The electronic device of claim 8, the display module further comprising thin film transistor (TFT) lines around the second deactive area.

10. The electronic device of claim 1, the display module further comprising:

a first substrate;

a second substrate opposite the first substrate;

a liquid crystal layer between the first substrate and the second substrate;

a color filter on the first substrate; and thin film transistor (TFT) lines on the second substrate and circumventing the opening of the display module.

11. The electronic device of claim 1, further comprising:

a gear box mechanically connected to the movement; and a crown mechanically connected to the gear box, wherein the shaft rotates depending on a rotation of the crown.

12. The electronic device of claim 1, the shaft comprising an internal shaft and an external shaft the external shaft surrounding the internal shaft, wherein the at least one hand comprises a first hand fixed to the internal shaft and a second hand fixed to the external shaft.

13. The electronic device of claim 12, wherein the first hand is different from the second hand in at least one of a length, a width, and shape.

14. The electronic device of claim 1, further comprising a controller configured to display a clock index through the display module, wherein the controller controls the display module to display at least one of a chronograph, a dial, data information, date information, and weather information.

15. The electronic device of claim 14, further comprising a wireless communication unit, wherein the controller is configured to interwork with an external terminal or an external electronic device through the wireless communication unit.

16. The electronic device of claim 1, wherein the display module has a circular shape and the opening is located in the middle of the display module.

17. The electronic device of claim 1, wherein the display panel displays a dial along a perimeter of the display panel.

18. The electronic device of claim 17, wherein a portion of the dial is activated in accordance with a location of the at least one hand, and wherein another portion of the dial is inactivated.

19. The electronic device of claim 18, wherein the at least one hand includes a first hand and a second hand, and wherein the portion of the dial includes:

a first portion of the dial positioned adjacent to the first hand; and a second portion of the dial positioned adjacent to the second hand.

* * * * *